United States Patent
John Wilson et al.

(10) Patent No.: US 11,109,380 B2
(45) Date of Patent: *Aug. 31, 2021

(54) UPLINK CONTROL CHANNEL BEAM SWITCH PROCEDURE

(71) Applicant: QUALCOMM Incorporated, San Diego, CA (US)

(72) Inventors: Makesh Pravin John Wilson, San Diego, CA (US); Sony Akkarakaran, Poway, CA (US); Tao Luo, San Diego, CA (US); Yan Zhou, San Diego, CA (US); Xiao Feng Wang, San Diego, CA (US); Wooseok Nam, San Diego, CA (US); Abhishek Sinha, Kolkata (IN)

(73) Assignee: QUALCOMM Incorporated, San Diego, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/291,579

(22) Filed: Mar. 4, 2019

(65) Prior Publication Data

US 2019/0313389 A1 Oct. 10, 2019

Related U.S. Application Data

(60) Provisional application No. 62/653,520, filed on Apr. 5, 2018.

(51) Int. Cl.
*H04W 72/04* (2009.01)
*H04B 7/0417* (2017.01)
*H04B 7/06* (2006.01)

(52) U.S. Cl.
CPC ........ *H04W 72/046* (2013.01); *H04B 7/0417* (2013.01); *H04B 7/061* (2013.01); *H04W 72/0413* (2013.01); *H04W 72/0446* (2013.01)

(58) Field of Classification Search
CPC ........................ H04W 72/046; H04B 7/0417
See application file for complete search history.

(56) References Cited

U.S. PATENT DOCUMENTS 10,027,456 B2 7/2018 Nagaraja et al.
10,879,964 B2 * 12/2020 Yiu ..................... H04B 7/0617
(Continued)

FOREIGN PATENT DOCUMENTS

WO WO-2017151876 A1 9/2017
WO WO-2017221202 A1 12/2017
(Continued)

OTHER PUBLICATIONS

Ericsson: "Analysis of Beam Indication Signalling Options", 3GPP Draft, 3GPP TSG RAN WG1 Meeting #90bis, R1-1718743 Analysis of Beam Indication Signalling Options, 3rd Generation Partnership Project (3GPP), Mobile Competence Centre, 650, Route Des Lucioles, F-06921 Sophia-Antipolis Cedex, vol. RAN WG1. No. Prague, CZ, Oct. 9, 2017-Oct. 13, 2017, Oct. 8, 2017 (Oct. 8, 2017), XP051341913, 14 Pages, Retrieved from the Internet: URL:http://www.3gpp.org/ftp/Meetings_3GPP_SYNC/RAN1/Docs/ [retrieved on Oct. 8, 2017] figures 2-8 sections 2.1.2 and 2.1.3.

(Continued)

*Primary Examiner* — Deepa Belur
(74) *Attorney, Agent, or Firm* — Shankar Krithivasan

(57) ABSTRACT

Methods, systems, and devices for wireless communications are described. One method may include receiving, by a user equipment (UE) in a downlink shared data channel, a beam switch command instructing the UE to switch from a first uplink control beam to a second uplink control beam. The UE may select an uplink control beam to transmit acknowledgment feedback based on whether decoding the beam switch command is successful, and transmit, in an uplink control channel via the selected uplink control beam, the (Continued)

acknowledgment feedback indicating whether decoding the beam switch command was successful.

28 Claims, 18 Drawing Sheets

(56) References Cited

U.S. PATENT DOCUMENTS

| | | | | |
|---|---|---|---|---|
| 2007/0165736 | A1* | 7/2007 | Wang | H04B 7/0695 375/267 |
| 2018/0084440 | A1 | 3/2018 | Nagaraja et al. | |
| 2018/0084441 | A1 | 3/2018 | Nagaraja et al. | |
| 2018/0212659 | A1* | 7/2018 | Xiong | H04B 7/0695 |
| 2018/0219604 | A1* | 8/2018 | Lu | H04L 1/1607 |
| 2018/0279181 | A1* | 9/2018 | Hampel | H04W 36/0033 |
| 2018/0294937 | A1 | 10/2018 | Nagaraja et al. | |
| 2019/0081688 | A1* | 3/2019 | Deenoo | H04B 7/088 |
| 2019/0150013 | A1* | 5/2019 | Zhang | H04W 24/10 375/224 |
| 2019/0199412 | A1* | 6/2019 | Koskela | H04B 7/0417 |
| 2019/0215701 | A1* | 7/2019 | Honglei | H04B 7/0617 |
| 2019/0230680 | A1* | 7/2019 | Kim | H04W 72/1231 |
| 2019/0312628 | A1* | 10/2019 | Bergstrom | H04B 7/0404 |
| 2019/0349065 | A1* | 11/2019 | Zhang | H04W 72/1273 |
| 2019/0379431 | A1* | 12/2019 | Park | H04B 7/0408 |
| 2020/0076487 | A1* | 3/2020 | Liu | H04B 7/0695 |
| 2020/0077320 | A1* | 3/2020 | Shimoda | H04L 5/001 |
| 2020/0112993 | A1* | 4/2020 | Tsai | H04W 72/005 |
| 2020/0221319 | A1* | 7/2020 | Kang | H04W 72/046 |

FOREIGN PATENT DOCUMENTS

| | | | | |
|---|---|---|---|---|
| WO | WO-2018059456 | A1 * | 4/2018 | H04W 72/04 |
| WO | WO-2018137451 | A1 * | 8/2018 | H04B 7/0695 |

OTHER PUBLICATIONS

International Search Report and Written Opinion—PCT/US2019/020735—ISA/EPO—dated Jun. 13, 2019.
Co-pending U.S. Appl. No. 17/116,965, inventor Taherzadeh Boroujeni; Mahmoud, filed on Dec. 9, 2020.

* cited by examiner

UPLINK CONTROL CHANNEL BEAM SWITCH PROCEDURE

CROSS REFERENCES

The present Application for Patent claims the benefit of U.S. Provisional Patent Application No. 62/653,520 by JOHN WILSON, et al., entitled "UPLINK CONTROL CHANNEL BEAM SWITCH PROCEDURE," filed Apr. 5, 2018, assigned to the assignee hereof, and expressly incorporated herein.

BACKGROUND

The following relates generally to wireless communications, and more specifically to uplink control channel beam switch procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may utilize physical uplink control channel (PUCCH) transmissions for a variety of reasons. The PUCCH transmissions may be uplink transmissions from a UE to a base station. The PUCCH transmissions may also be beamformed transmissions that are controlled via beam management. A UE may rely on PUCCH to carry or otherwise convey an indication of feedback for a physical channel. However, in some situations a beam used to transmit the PUCCH transmissions may degrade, sometimes suddenly, to a point that the beam (e.g., the beam configuration) may no longer reliably be used to support PUCCH transmissions. In some aspects, a base station may determine that a beam used for PUCCH transmissions has degraded and may instruct a UE to switch beams. Conventional beam switching management techniques, however, may be deficient.

SUMMARY

The described techniques relate to improved methods, systems, devices, and apparatuses that support uplink control channel beam switch procedure. The techniques relate to enabling a user equipment (UE) to select on which uplink control beam to send acknowledgment feedback to enhance reliability of acknowledgment feedback transmission. A base station may transmit a beam switch command instructing a user equipment (UE) to switch from a first uplink control beam to a second uplink control beam for transmitting control messages via a control channel, such as a physical uplink control channel (PUCCH). In some examples, a medium access control (MAC) control element (CE) or downlink control information (DCI) may include the beam switch command. The beam switch command may be provided to the UE via a downlink shared data channel, e.g., physical downlink shared channel (PDSCH).

The UE may receive the beam switch command and select an uplink control beam to transmit acknowledgment feedback based on whether decoding of the beam switch command was successful. In some cases, the UE may perform a cyclic redundancy check (CRC) on a shared data channel (e.g., PDSCH) and/or data carrying the beam switch command. If CRC fails, the UE may send a negative acknowledgement using the first uplink control beam. If CRC passes, the UE may send an acknowledgement using the second uplink control beam. The base station may monitor an uplink control channel for acknowledgment feedback. Beneficially, the UE may use the new, second uplink control beam for sending the acknowledgment feedback in the uplink control channel when able to successfully decode a beam switch command. The new, second uplink control beam is expected to be associated with better wireless channel conditions than the first uplink control beam, thereby increasing the likelihood of successful receipt of acknowledgment feedback by the base station.

A method of wireless communications at a UE is described. The method may include receiving, in a downlink shared data channel, a beam switch command instructing the UE to switch from a first uplink control beam to a second uplink control beam, selecting an uplink control beam to transmit acknowledgment feedback based on whether decoding the beam switch command is successful, and transmitting, in an uplink control channel via the selected uplink control beam, the acknowledgment feedback indicating whether decoding the beam switch command was successful.

An apparatus for wireless communications is described. The apparatus may include a processor, memory in electronic communication with the processor, and instructions stored in the memory. The instructions may be executable by the processor to cause the apparatus to receiving, in a downlink shared data channel, a beam switch command instructing the apparatus to switch from a first uplink control beam to a second uplink control beam, selecting an uplink control beam to transmit acknowledgment feedback based on whether decoding the beam switch command is successful, and transmitting, in an uplink control channel via the selected uplink control beam, the acknowledgment feedback indicating whether decoding the beam switch command was successful.

Another apparatus for wireless communications is described. The apparatus may include receiving, in a downlink shared data channel, a beam switch command instructing the apparatus to switch from a first uplink control beam to a second uplink control beam, selecting an uplink control beam to transmit acknowledgment feedback based on whether decoding the beam switch command is successful, and transmitting, in an uplink control channel via the selected uplink control beam, the acknowledgment feedback indicating whether decoding the beam switch command was successful.

A non-transitory computer-readable medium storing code for wireless communications at a UE is described. The code may include instructions executable by a processor to receiving, in a downlink shared data channel, a beam switch command instructing a UE to switch from a first uplink control beam to a second uplink control beam, selecting an uplink control beam to transmit acknowledgment feedback based on whether decoding the beam switch command is successful, and transmitting, in an uplink control channel via the selected uplink control beam, the acknowledgment feedback indicating whether decoding the beam switch command was successful.

In some examples of the method, apparatuses, and non-transitory computer-readable medium described herein, selecting the uplink control beam to transmit the acknowledgment feedback further may include operations, features, means, or instructions for selecting the second uplink control beam to transmit the acknowledgment feedback based on successfully decoding the beam switch command.

In some examples of the method, apparatuses, and non-transitory computer-readable medium described herein, transmitting, in the uplink control channel via the selected uplink control beam, the acknowledgment feedback, further may include operations, features, means, or instructions for identifying a second transmission time interval (TTI) to transmit the acknowledgment feedback that occurs after a first TTI based on successfully decoding the beam switch command, determining not to transmit the acknowledgment feedback via the first uplink control beam during the first TTI and transmitting, in the uplink control channel via the second uplink control beam, the acknowledgment feedback during the second TTI.

In some examples of the method, apparatuses, and non-transitory computer-readable medium described herein, selecting the uplink control beam to transmit the acknowledgment feedback further may include operations, features, means, or instructions for selecting each of the first uplink control beam and the second uplink control beam to transmit the acknowledgment feedback based on successfully decoding the beam switch command.

In some examples of the method, apparatuses, and non-transitory computer-readable medium described herein, transmitting, in the uplink control channel via the selected uplink control beam, the acknowledgment feedback, further may include operations, features, means, or instructions for transmitting, in the uplink control channel via the first uplink control beam, the acknowledgment feedback in a first TTI and transmitting, in the uplink control channel via the second uplink control beam, the acknowledgment feedback in a second TTI that occurs after the first TTI.

In some examples of the method, apparatuses, and non-transitory computer-readable medium described herein, receiving the beam switch command further may include operations, features, means, or instructions for receiving a grant of resources for the uplink control channel for transmitting the acknowledgment feedback during the second TTI.

In some examples of the method, apparatuses, and non-transitory computer-readable medium described herein, selecting the uplink control beam to transmit the acknowledgment feedback further may include operations, features, means, or instructions for selecting the first uplink control beam to transmit the acknowledgment feedback based on failing to successfully decode the beam switch command.

In some examples of the method, apparatuses, and non-transitory computer-readable medium described herein, transmitting, in the uplink control channel via the selected uplink control beam, the acknowledgment feedback, further may include operations, features, means, or instructions for identifying a first TTI to transmit the acknowledgment feedback that occurs prior to a second TTI based on failing to successfully decode the beam switch command and transmitting, in the uplink control channel via the first uplink control beam, the acknowledgment feedback during the first TTI.

Some examples of the method, apparatuses, and non-transitory computer-readable medium described herein may further include operations, features, means, or instructions for receiving, in the downlink shared data channel, a second beam switch command instructing the apparatus to switch from the first uplink control beam to the second uplink control beam, selecting the first uplink control beam, the second uplink control beam, or both, to transmit second acknowledgment feedback based on whether decoding the second beam switch command may be successful and transmitting, in the uplink control channel via the first uplink control beam, the second uplink control beam, or both, the second acknowledgment feedback indicating whether decoding the second beam switch command was successful.

Some examples of the method, apparatuses, and non-transitory computer-readable medium described herein may further include operations, features, means, or instructions for receiving control signaling configuring the set of different transport configuration indicator (TCI) states.

In some examples of the method, apparatuses, and non-transitory computer-readable medium described herein, receiving the beam switch command further may include operations, features, means, or instructions for receiving a medium access control (MAC) control element (CE) including the beam switch command.

In some examples of the method, apparatuses, and non-transitory computer-readable medium described herein, receiving the beam switch command further may include operations, features, means, or instructions for receiving downlink control information including the beam switch command.

In some examples of the method, apparatuses, and non-transitory computer-readable medium described herein, receiving the beam switch command further may include operations, features, means, or instructions for receiving a grant of resources for the uplink control channel for transmitting the acknowledgment feedback.

In some examples of the method, apparatuses, and non-transitory computer-readable medium described herein, receiving the beam switch command further may include operations, features, means, or instructions for receiving the beam switch command in the downlink shared data channel via a receive beam.

Some examples of the method, apparatuses, and non-transitory computer-readable medium described herein may further include operations, features, means, or instructions for receiving, in a downlink control channel via a downlink control receive beam, a grant scheduling the beam switch command in the downlink shared data channel.

Some examples of the method, apparatuses, and non-transitory computer-readable medium described herein may further include operations, features, means, or instructions for deriving the first uplink control beam from the downlink control receive beam.

A method of wireless communications at a base station is described. The method may include transmitting, in a downlink shared data channel, a beam switch command instructing a UE to switch from a first uplink control beam to a second uplink control beam, monitoring an uplink control channel for acknowledgment feedback via the first uplink control beam or the second uplink control beam, the acknowledgment feedback indicating whether decoding the beam switch command was successful, and transmitting a transmission to the UE based on which of the first uplink control beam or the second uplink control beam was used to transmit the acknowledgment feedback.

An apparatus for wireless communications is described. The apparatus may include a processor, memory in electronic communication with the processor, and instructions stored in the memory. The instructions may be executable by the processor to cause the apparatus to transmitting, in a downlink shared data channel, a beam switch command instructing a UE to switch from a first uplink control beam to a second uplink control beam, monitoring an uplink control channel for acknowledgment feedback via the first uplink control beam or the second uplink control beam, the acknowledgment feedback indicating whether decoding the beam switch command was successful, and transmitting a transmission to the UE based on which of the first uplink control beam or the second uplink control beam was used to transmit the acknowledgment feedback.

Another apparatus for wireless communications is described. The apparatus may include transmitting, in a downlink shared data channel, a beam switch command instructing a UE to switch from a first uplink control beam to a second uplink control beam, monitoring an uplink control channel for acknowledgment feedback via the first uplink control beam or the second uplink control beam, the acknowledgment feedback indicating whether decoding the beam switch command was successful, and transmitting a transmission to the UE based on which of the first uplink control beam or the second uplink control beam was used to transmit the acknowledgment feedback.

A non-transitory computer-readable medium storing code for wireless communications at a base station is described. The code may include instructions executable by a processor to transmitting, in a downlink shared data channel, a beam switch command instructing a UE to switch from a first uplink control beam to a second uplink control beam, monitoring an uplink control channel for acknowledgment feedback via the first uplink control beam or the second uplink control beam, the acknowledgment feedback indicating whether decoding the beam switch command was successful, and transmitting a transmission to the UE based on which of the first uplink control beam or the second uplink control beam was used to transmit the acknowledgment feedback.

Some examples of the method, apparatuses, and non-transitory computer-readable medium described herein may further include operations, features, means, or instructions for determining that the second uplink control beam was used to transmit the acknowledgment feedback, where the transmission may be a data transmission to the UE.

Some examples of the method, apparatuses, and non-transitory computer-readable medium described herein may further include operations, features, means, or instructions for determining that the first uplink control beam was used to transmit the acknowledgment feedback, where the transmission may be a second beam switch command instructing the UE to switch from the first uplink control beam to the second uplink control beam.

In some examples of the method, apparatuses, and non-transitory computer-readable medium described herein, monitoring the uplink control channel for the acknowledgment feedback further may include operations, features, means, or instructions for monitoring the uplink control channel for the acknowledgment feedback during a first TTI that occurs prior to a second TTI, the first TTI corresponding to the UE failing to successfully decode the beam switch command.

In some examples of the method, apparatuses, and non-transitory computer-readable medium described herein, monitoring the uplink control channel for the acknowledgment feedback further may include operations, features, means, or instructions for monitoring the uplink control channel for the acknowledgment feedback during a second TTI that occurs after a first TTI, the second TTI corresponding to the UE successfully decoding the beam switch command.

DETAILED DESCRIPTION

Figure 1:
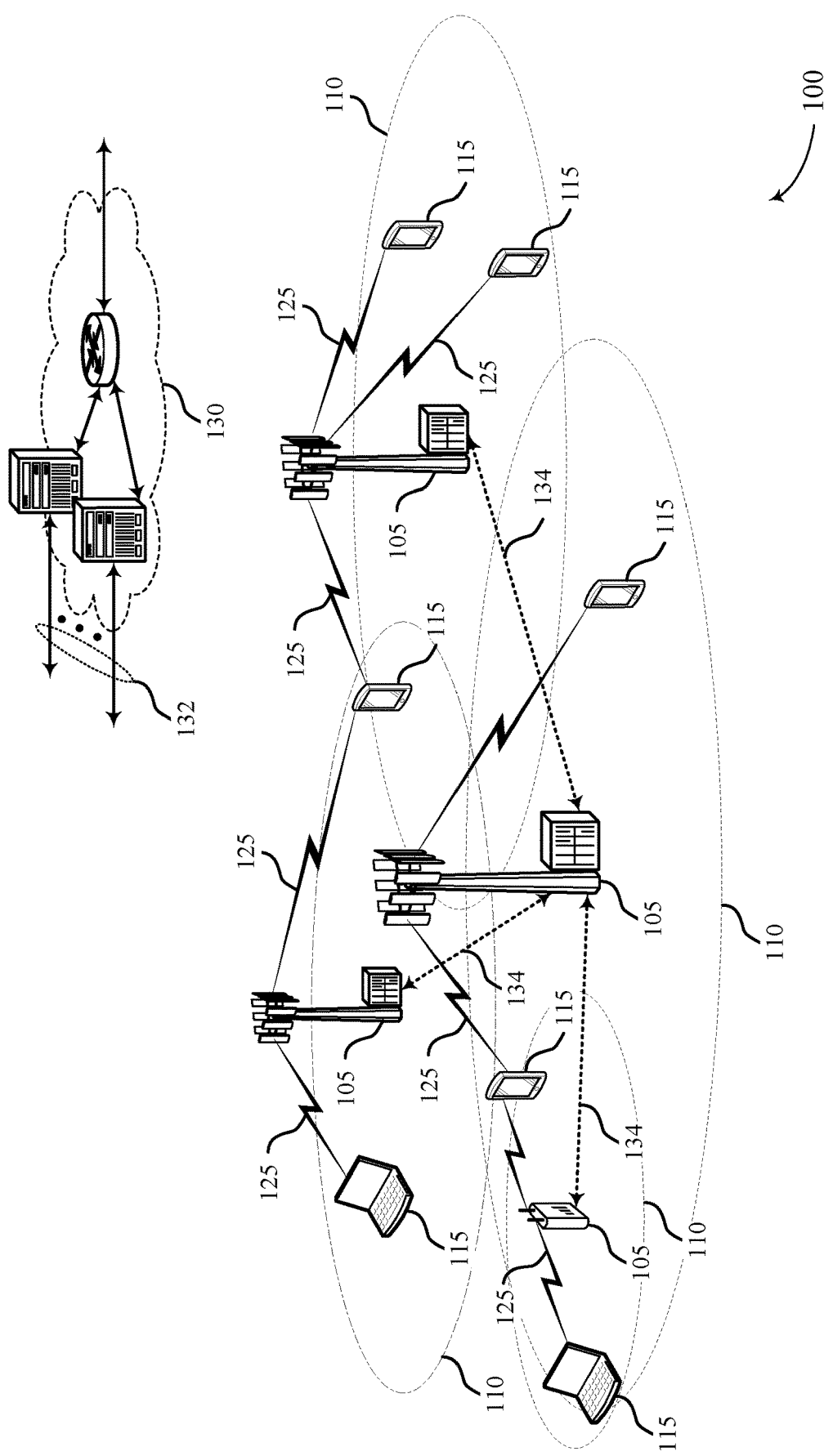
FIGS. 1 and 2 illustrate examples of a wireless communications system that support an uplink control channel beam switch procedure in accordance with aspects of the present disclosure.

The described techniques relate to improved methods, systems, devices, and apparatuses that support uplink control channel beam switch procedure. A base station may determine a degradation of a control beam associated with a user equipment (UE) due to, for example, blocking, noise, interference, fading, or the like. The base station may transmit, in a downlink shared data channel, a beam switch command to the UE. The beam switch command may provide an indication for the UE to switch an uplink control beam e.g., a physical uplink control channel (PUCCH), due to the degradation. The UE may be configured to provide feedback acknowledging reception of the beam switch command. The described techniques relate to configuring the UE with the capability to select an uplink control beam to transmit acknowledgement feedback. By providing the UE with this capability, reliability of the feedback transmission may be improved.

In an example, a UE may select an uplink control beam to transmit acknowledgment feedback based on whether decoding of the beam switch command was successful. In some cases, the UE may perform a cyclic redundancy check (CRC) on a downlink shared data channel (e.g., PDSCH) and/or data carrying the beam switch command. If the CRC fails, the UE may send a negative acknowledgement using the first uplink control beam. If the CRC passes, the UE may send an acknowledgement using the second uplink control beam. The base station may monitor an uplink control channel for acknowledgment feedback. Beneficially, the UE may use the new, second uplink control beam for sending the acknowledgment feedback in the uplink control channel when able to successfully decode a beam switch command. The new, second uplink control beam is expected to be associated with better wireless channel conditions than the first uplink control beam, thereby increasing the likelihood of successful receipt of the acknowledgment feedback by the base station.

In some examples, a base station may communicate with a UE on active communication beam pairs. The active communication beam pairs may be used for transmitting data and control information. An active communication beam pair may include a downlink receive beam and an uplink transmit beam for the UE, and a downlink transmit beam and an uplink receive beam for the base station. In some aspects, the base station may instruct the UE to change an active communication beam, for example, due to mobility, interference, blockage, and the like. In the case that the base station identifies a degraded performance of an active communication beam, such as due to blockage, the base station may transmit a beam switch signal, also referred to as a beam switch command, to the UE.

For a conventional downlink beam switch scenario, a base station uses a downlink control beam for communicating to a UE, and the UE uses an uplink control beam for communicating to the base station. At some time, the base station may determine to instruct the UE to switch its uplink control beam. In some examples, the base station may send a beam switch signal in a medium access control (MAC) control element (CE) (MAC-CE) or downlink control information (DCI). For example, the base station may transmit a beam switch signal to the UE in a MAC-CE on a downlink beam (e.g., physical downlink shared channel (PDSCH)). The beam switch signal may instruct the UE to switch from an old uplink control beam to a new uplink control beam. The UE may receive and decode the beam switch signal. The UE may determine whether decoding a downlink shared data channel (e.g., PDSCH) and/or data carrying the beam switch command passed a cyclic redundancy check (CRC), and may transmit, using the old uplink control beam, an acknowledgement (ACK) or a negative acknowledgment (NACK) to the base station indicating whether the UE successfully decoded the beam switch signal. However, this existing technique may be unreliable if, for example, the old uplink control beam is blocked, if channel conditions are poor in the direction of the old uplink control beam, or the like.

The techniques described herein may permit the UE to select which uplink control beam to use for transmitting acknowledgment feedback based on whether a PDSCH and/or data carrying a beam switch command passes error detection (e.g., a CRC), thereby enhancing communications efficiency and reducing latency in a wireless communication system.

Moreover, the techniques described herein resolve existing challenges related to conventional techniques for signaling feedback for beam switch procedures. In an example, a base station may transmit a beam switch signal over a downlink transmit beam, which the UE may receive via a downlink receive beam. In some cases, as part of the beam switch signal transmission, the base station may transmit a grant to the UE. The grant may schedule and allocate resources for a beam switch procedure and a feedback transmission associated with the beam switch signal. The grant may indicate resources e.g., time and frequency resources, for transmitting an acknowledgment/non-acknowledgement for the beam switch signal indicated in a MAC-CE or a DCI. The UE may select an uplink transmit beam based on whether decoding of the beam switch signal passes error detection. In some examples, the UE may transmit feedback on a current uplink control beam or a new uplink control beam based on whether decoding of the beam switch signal passes error detection.

Aspects of the disclosure are initially described in the context of a wireless communications system. Aspects of the disclosure are then described in the context of a timeline and process flow. Aspects of the disclosure are further illustrated by and described with reference to apparatus diagrams, system diagrams, and flowcharts that relate to uplink control channel beam switch procedure.

FIG. 1 illustrates an example of a wireless communications system 100 that supports uplink control channel beam switch procedure in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A base station 105 may transmit, in a downlink shared data channel, a beam switch command instructing a UE 115 to switch from a first uplink control beam to a second uplink control beam. The base station 105 may monitor an uplink control channel for acknowledgment feedback via the first uplink control beam or the second uplink control beam. The acknowledgment feedback may indicate whether the UE 115 successfully decoded the beam switch command.

The UE 115 may receive, in the downlink shared data channel, the beam switch command instructing the UE 115 to switch from the first uplink control beam to the second uplink control beam, and select an uplink control beam to transmit acknowledgment feedback based at least in part on whether decoding the beam switch command is successful. The UE 115 may transmit, in an uplink control channel via the selected uplink control beam, the acknowledgment feedback indicating whether decoding the beam switch command was successful. The base station 105 may transmit a subsequent transmission to the UE 115 based on which of the first uplink control beam or the second uplink control beam was used to transmit the acknowledgment feedback. In some cases, where the acknowledgment feedback is a NACK, the subsequent transmission may be a second beam switch command again instructing the UE 115 to switch from the first uplink control beam to the second uplink control beam. In some cases, where the acknowledgment feedback is an ACK, the subsequent transmission may be a data transmission to the UE 115.

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as $T_f$=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Conventional technique may be unreliable where the UE uses a current uplink control beam, instead of a new uplink control beam, for transmitting acknowledgment feedback for a beam switch command. The techniques described herein may permit the UE to select which uplink control beam to use for transmitting acknowledgment feedback based on whether a downlink shared data channel and/or data carrying a beam switch command passes error detection (e.g., a CRC), thereby enhancing communications efficiency and reducing latency in a wireless communication system.

Figure 2:
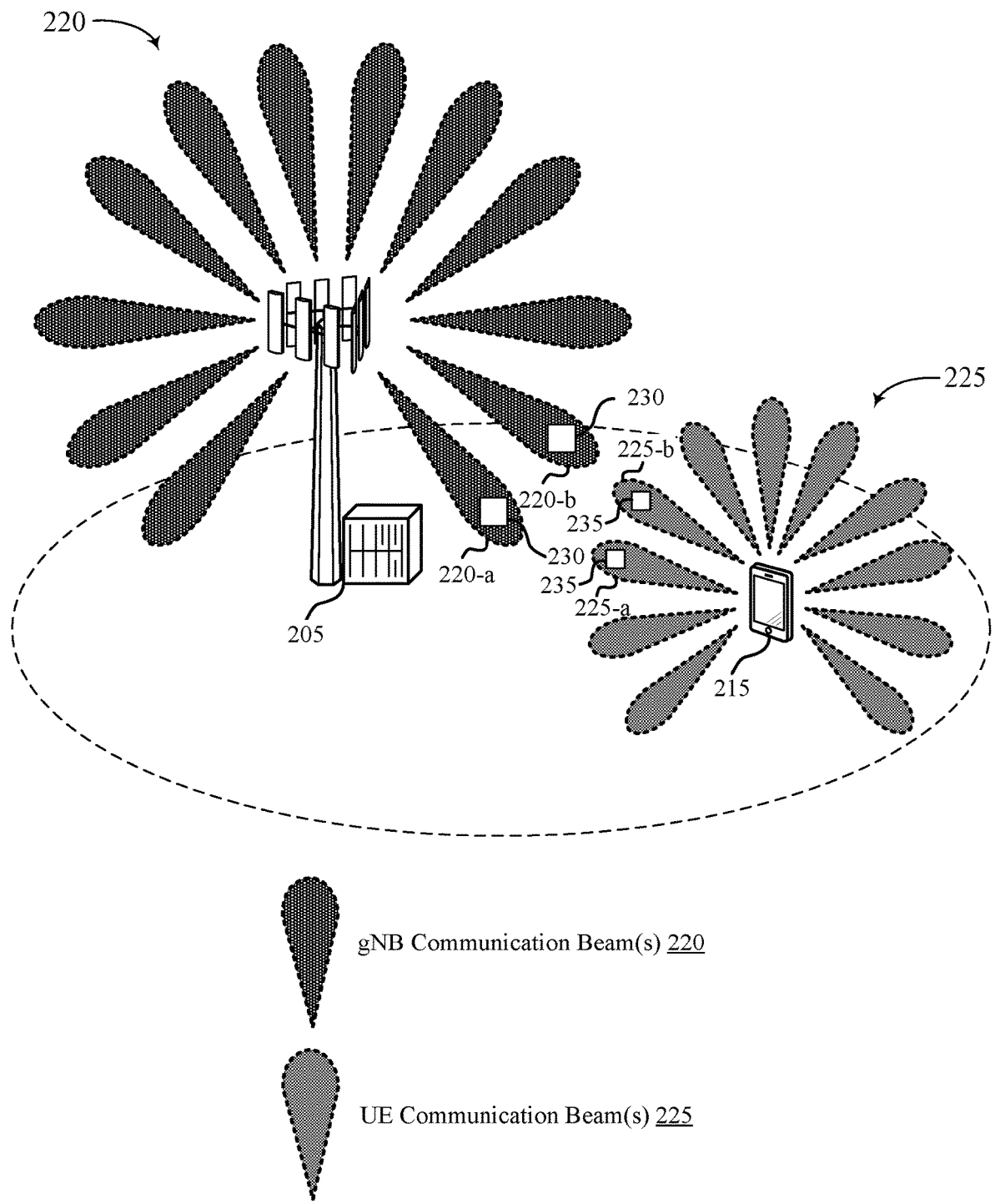

FIG. 2 illustrates an example of a wireless communication system 200 that supports an uplink control channel beam switch procedure in accordance with aspects of the present disclosure. In some examples, the wireless communication system 200 may implement aspects of wireless communication system 100. The wireless communication system 200 may include a base station 205 and a UE 215, which may be examples of the corresponding devices described with reference to FIG. 1. The wireless communication system 200 may support handling feedback (acknowledgment/non-acknowledgment) signaling related to a beam switch procedure to enhance communications efficiency and reduce latency in the wireless communication system 200, while resolving existing challenges related to conventional techniques for signaling feedback for beam switch procedures. In some cases, the wireless communications system 200 may support feedback signaling on a physical uplink control channel (PUCCH) for a beam switch procedure.

The base station 205 may perform a radio resource control (RRC) procedure (e.g., cell acquisition procedure, random access procedure, RRC connection procedure, RRC configuration procedure) with the UE 215. The base station 205 may be configured with multiple antennas, which may be used for directional or beamformed transmissions (e.g., beamformed communication beams 220). Similarly, the UE 215 may be configured with multiple antennas, which may be used for directional or beamformed transmissions (e.g., beamformed communication beams 225). In some examples, the RRC procedure may include a beam sweep procedure. As illustrated, the base station 205 and/or the UE 215 may transmit a number of beamformed communication beams 220, 225 in different directions within a coverage area.

As part of the RRC procedure, the base station 205 and the UE 215 may synchronize before the base station 205 schedules and allocates resources (e.g., time and frequency resources) for uplink and/or downlink communication between the base station 205 and the UE 215. In some cases, the base station 205 and the UE 215 may repeat the beam sweep pattern over different communication beams 220, 225 in an order which may be determined according to a given beam sweep pattern. The base station 205 and the UE 215 may have at least one active communication beam pair that is being used for wireless communications, as a result of the RRC procedure.

The base station 205 may communicate with the UE 215 on an active communication beam 220-a, and the UE 215 may communicate with the base station 205 on an active communication beam 225-a. The active communication beam may be used for transmitting transmission 230, 235 such as data and control information. The active communication beam may be a downlink receive beam and an uplink transmit beam for the UE 215, or a downlink transmit beam and an uplink receive beam for the base station 205. In some aspects, an active communication beam may change, for example, due to mobility, interference, blockage, and the like. In the case that the base station 205 identifies a change to an active communication beam, such as due to blockage, the base station 205 may transmit a beam switch signal, also referred to as a beam switch command, to the UE 215.

In a downlink scenario, the base station 205 can switch a downlink control beam after reception of an acknowledgement from the UE 215 that a beam switch command was successfully received. For example, the base station 205 may transmit a beam switch signal to the UE 215 in a MAC-CE on a downlink beam (e.g., PDSCH), which the UE 215 may receive on a downlink receive beam. The beam switch signal may instruct the UE 215 to switch from a current uplink control beam to a new uplink control beam (e.g., from beam 225-a to beam 225-b). The UE 215 may decode the beam switch signal and transmit feedback for the beam switch signal on the current uplink control beam. However, the existing technique of switching a beam after transmitting an acknowledgement on the current uplink control beam) may be unreliable as the current uplink control beam may be blocked and/or otherwise be associated with poor channel conditions. As a result, the base station 205 may, in some instances, fail to receive via the degraded beam acknowledgement that the UE successfully decoded the beam switch command. As a result, the base station 205 may incorrectly believe that the UE 215 did not receive the beam switch command, thereby increasing latency as the base station 205 may retransmit the beam switch command a second time due to not receiving the positive acknowledgment.

Therefore, the wireless communication system 200 applying the techniques described herein may support handling feedback signaling related to a beam switch procedure to enhance communications efficiency and reduce latency in the wireless communication system 200, while resolving existing challenges related to conventional techniques for signaling feedback for beam switch procedures.

In an example, the base station 205 may transmit, to the UE 215, the beam switch signal over a shared data channel using a transmit beam (e.g., via a physical downlink shared channel (PDSCH)), which the UE 215 may receive via a downlink receive beam. The base station 205 may schedule a PDSCH transmission of the beam switch signal using a physical downlink control channel (PDCCH). For example, the base station 205 may transmit scheduling information, via a downlink control information (DCI) on a PDCCH, including time and frequency resources for a PDSCH transmission from the base station 205 to the UE 215. In some examples, the base station 205 may transmit, to the UE 215, the beam switch signal in MAC-CE or in a DCI via PDCCH, which the UE 215 may receive via a downlink receive beam.

The beam switch signal may instruct the UE 215 to switch from a current active communication beam 225-a to a new active communication beam 225-b. The active communication beam 225-a may be a first uplink control transmit beam and the active communication beam 225-b may be a second uplink control transmit beam. If able to successfully decode the beam switch signal, the UE 215 may transmit uplink control information (UCI) including an acknowledgement (ACK) on the new active communication beam 225-b instead of (or in addition to) transmitting the ACK on the current active communication beam 225-a. If unable to successfully decode the beam switch signal, the UE 215 may transmit UCI including a negative acknowledgment (NACK) on the current active communication beam 225-a.

In some cases, as part of the beam switch signal transmission, the base station 205 may transmit a grant to the UE 215. The grant may schedule and allocate resources for a beam switch procedure and a feedback transmission associated with the beam switch signal. For example, the grant may indicate resources e.g., time and frequency resources, for transmitting an ACK/NACK for the beam switch signal indicated in a MAC-CE or a DCI. The grant may allocate resources to send an ACK on the new active communication beam 225-b, on both the current active communication beam 225-a and the new active communication beam 225-b, or a NACK on the current active communication beam 225-a.

In some cases, when scheduling resources for a feedback transmission, the base station 205 may also schedule the UE 215 with multiple resource sets. For each resource set, the base station 205 may schedule multiple resources, with each resource having a configured time resource, frequency resources, and one quasi-colocation (QCL) assumption (e.g., spatial relation information) indicating a communication beam to be used for a feedback transmission. For example, the feedback transmission may be scheduled to be transmitted on the switched active communication beam 225-b using resources of the resource set, after a preconfigured number of TTIs or slots (e.g., $K_0$) following a beam switch procedure, such that UE 215 may have time to transition from the active communication beam 225-a to the active communication beam 225-b (e.g., where $K_0 \geq$ transition time).

In some examples, the base station 205 may configure the UE 215 with a set of different transport configuration indicator (TCI) states. Each of the TCI states may be associated with a different uplink control beam. The beam switch signal may indicate a particular one of the TCI states to indicate to the UE 215 to switch from a current uplink control beam to a new uplink control beam associated with the indicated TCI state.

In some cases, the TCI state may indicate a communication beam including a reference signal (e.g., synchronization signal blocks (SSBs), channel state information reference signals (CSI-RSs), or tracking reference signals (TRSs)) for the UE 215 to use to perform receiver processing for demodulating and decoding data and control information to be received from base station 205. In some examples, the TCI state may indicate a communication beam for the UE 215 to switch to during a beam switch procedure, and transmit feedback on. For example, the UE 215 may determine which TCI state to use based on decoding a bit sequence associated with the plurality of different TCI states. The TCI states may also indicate a QCL parameter (e.g., spatial properties, delay spread, Doppler effect) and relationships between antenna ports to UE 215.

In some examples, a resource set may have an identifier (e.g., resource set ID) or other identifier that is indicated by the base station 205. The resource set identifier may be indicated by a TCI state for a control channel (e.g., a PDCCH, a PUCCH) or a data channel (e.g., a PDSCH, a PUSCH), or both. The UE 215 may perform receiver processing such as demodulating and decoding control information (e.g., a beam switch signal) in accordance with the TCI state.

In some cases, the UE 215 may derive an uplink control beam from a downlink receive beam used by the base station 205. The uplink control beam may be reciprocal to the downlink receive beam. In some cases, the UE 215 may determine to transmit feedback related to the beam switch signal on the active communication beam 225-a, the active communication beam 225-b, or both. For example, the UE 215 may select to transmit feedback on the current active communication beam 225-a based on an unsuccessful decoding of the beam switch signal on a downlink receive beam. Additionally, or alternatively, the UE 215 may select to transmit feedback on the active communication beam 225-a, the active communication beam 225-b, or both based on a successful decoding of the beam switch signal on a downlink receive beam. In some examples, the UE 215 may also determine to transmit feedback related to the beam switch signal during a same TTI associated with the beam switch signal or during a different TTI. By providing, the UE 215 with capability to transmit feedback related to the beam switch signal on a switched (new) communication beam, existing challenges related to conventional techniques that are deficient for signaling feedback may be resolved.

Figure 3:
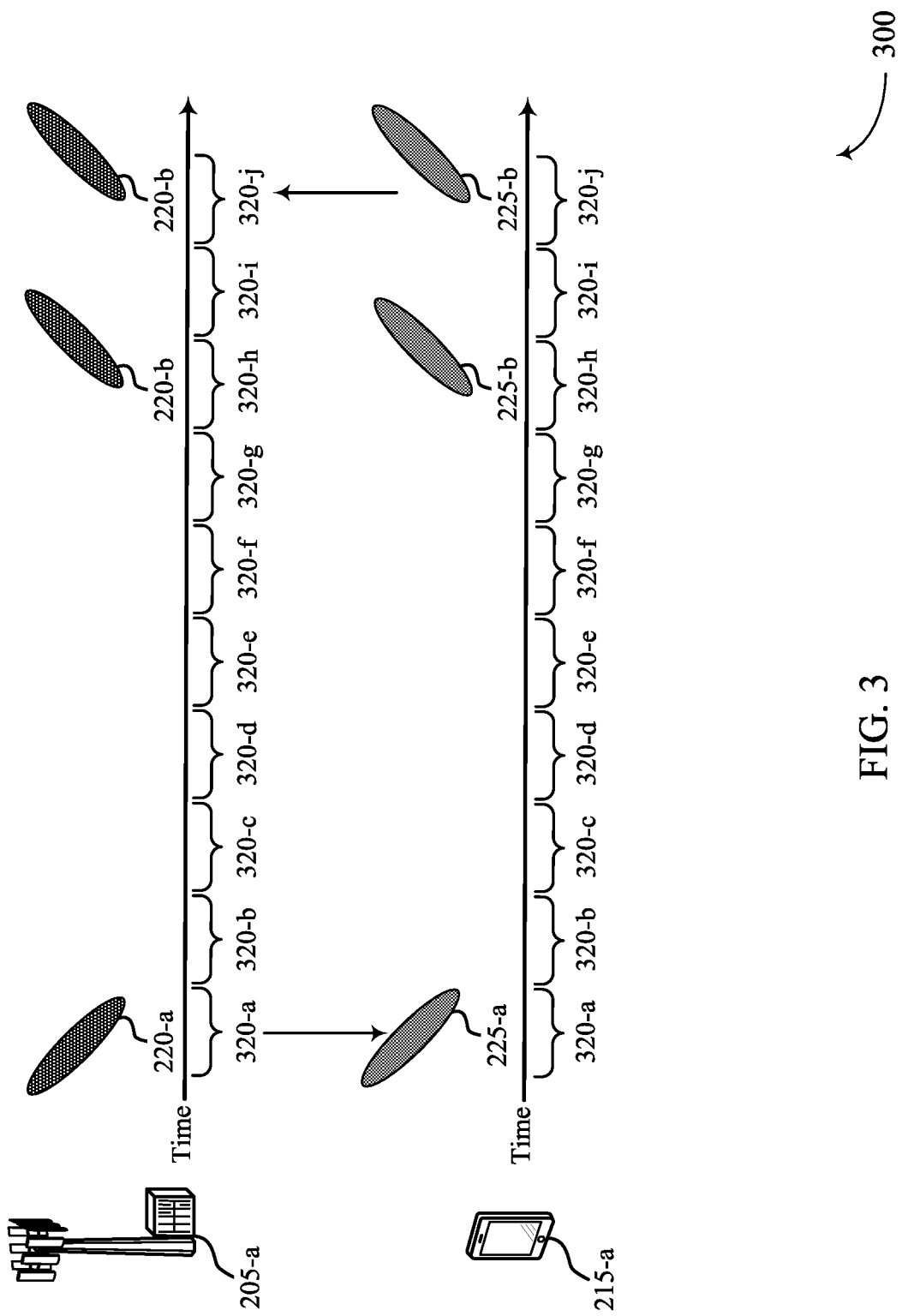
FIGS. 3 through 6 illustrate examples of timelines that support uplink control channel beam switch procedure in accordance with aspects of the present disclosure.

FIG. 3 illustrates an example of a timeline 300 that supports uplink control channel beam switch procedure in accordance with aspects of the present disclosure. In some examples, the timeline 300 may implement aspects of the wireless communication system 100 and 200. The timeline 300 may support handling feedback (acknowledgment/non-acknowledgment) signaling related to a beam switch procedure to enhance communications efficiency and reduce latency in a wireless communication system. The timeline 300 may include a base station 205-a and a UE 215-a, which may be examples of the corresponding devices described with reference to FIGS. 1 and 2.

The timeline 300 may illustrate an example situation where the base station 205-a determines to switch an uplink control channel (e.g., PUCCH) communication beam used by the UE 215-a. The timeline 300 may be expressed in multiples of a basic time unit, which may, for example, refer to a TTI (e.g., TTI 320-a through 320-j). A TTI may include one or more subframes, slots, frames, or the like. Each slot may contain, for example, 14 modulation symbol periods (e.g., OFDM symbols). In some cases, a TTI or a slot may be a scheduling unit in a wireless communication system.

The base station 205-a may determine that a status of an active communication beam is below an acceptable performance threshold. For example, the active communication beam may degrade due to blocking or fading, an available transmit power for the active communication beam may be below a threshold (e.g., due to a maximum permissible exposure (MPE) limitations), or the like. The base station 205-a may determine to transmit a beam switch signal to the UE 215-a on an active communication beam 220-a during TTI 320-a based on the degradation. For example, the base station 205-a may transmit the beam switch signal instructing the UE 215-a to switch communication beams. The active communication beam 220-a may be a downlink transmit beam or an uplink receive beam. In the example that the active communication beam 220-a is a downlink transmit beam, the beam switch signal may be transmitted in a MAC-CE on the downlink transmit beam e.g., a PDSCH transmission.

The UE 215-a may receive the beam switch signal on an active communication beam 225-a during TTI 320-a. For example, the active communication beam 225-a may be a downlink receive beam. After the UE 215-a receives the beam switch signal in the MAC-CE from the base station 205-a, the UE 215-a may determine whether a PDSCH and/or data carrying the beam switch signal passes error detection using, for example, a CRC. If the CRC passes, the UE 215-a may determine to transmit feedback associated with the beam switch signal to the base station 205-a on an uplink transmit beam. If successful, the UE 215-a may transmit feedback (e.g., an ACK) using a new active communication beam 220-b instead of communication beam 220-a.

In some cases, both the base station 205-a and the UE 215-a may switch an active communication beam during TTI 320-h. For example, the base station 205-a may switch from a current active communication beam 220-a to a new active communication beam 220-b. Similarly, the UE 215-a may switch from an active communication beam 225-a to an active communication beam 225-b. In some cases, the base station 205-a and the UE 215-a may switch an uplink beam, e.g., an uplink receive beam for the base station 205-a and an uplink transmit beam for the UE 215-a. The active communication beams 220-a, 220-b may be a downlink transmit beam or an uplink receive beam, or both. The active communication beams 225-a, 225-b may be a downlink receive beam or an uplink transmit beam, or both.

With reference to FIG. 2, the beam switch signal may also carry a grant allocating resources for transmitting feedback for the beam switch signal. The feedback may be scheduled to be transmitted on an active communication beam using resources of the resource set, after a preconfigured number of TTIs (e.g., $K_0$) following a beam switch procedure, such that UE 215-a may have time to switch active communication beams. After the preconfigured number of TTIs (e.g., $K_0$) following the beam switch procedure, the UE 215-a may transmit a feedback related to the beam switch signal (e.g., MAC-CE carried on the PDSCH) to the base station 205-a on the new active communication beam 225-b. The new active communication beam 225-b may be an uplink transmit control beam.

Subsequent transmission may continue over the new active communication beam 225-b. The timeline 300 may support providing an acknowledgment for a beam switch signal on a new indicated beam for robustness. Thereby, the described techniques provides an efficient mechanism where the UE 215-a can first perform a beam switch procedure and then transmit an ACK over a new communication beam to the base station 205-a for a beam switch signal triggering the beam switch procedure. In some cases, the timeline 300 may have latency because the UE 215-a may require some time to interpret the beam switch signal (e.g., MAC-CE) to switch communication beams. Processing the beam switch signal may involve, for example, layer 2 processing. As such, a mechanism for providing feedback sooner (e.g., having shorter $K_2$) may be desirable.

Figure 4:
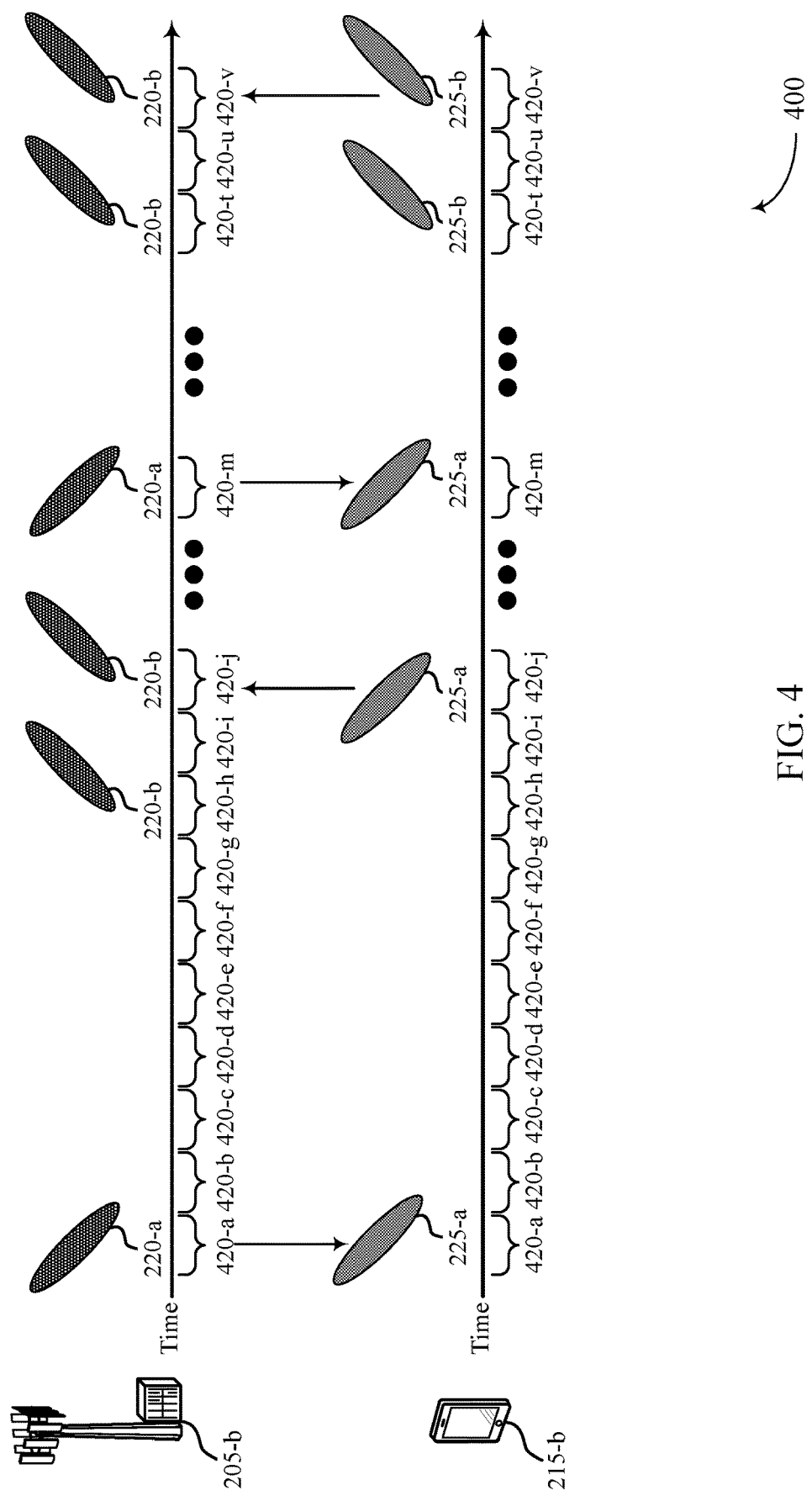

FIG. 4 illustrates an example of a timeline 400 that supports uplink control channel beam switch procedure in accordance with aspects of the present disclosure. In some examples, the timeline 400 may implement aspects of the wireless communication system 100 and 200. The timeline 400 may support handling feedback (acknowledgment/non-acknowledgment) signaling related to a beam switch procedure to enhance communications efficiency and reduce latency in a wireless communication system. The timeline 400 may include a base station 205-b and a UE 215-b, which may be examples of the corresponding devices described with reference to FIGS. 1 through 3. The timeline 400 may illustrate an example situation of the base station 205-b re-transmitting a beam switch signal and a feedback transmission (e.g., multiple PUCCH repetition). The timeline 400 may also illustrate an example scenario showing a CRC fail occasion related to a beam switch signal.

The timeline 400 may be expressed in multiples of a basic time unit, which may, for example, refer to a TTI (e.g., TTI 420-a through 420-v). A TTI may include one or more subframes, slots, frames, or the like. Each slot may contain, for example, 14 modulation symbol periods (e.g., OFDM symbols). In some cases, a TTI or a slot may be a scheduling unit in a wireless communication system. The base station 205-b may determine that a status of an active communication beam is below an acceptable performance threshold during TTI 420-a. For example, the active communication beam may degrade due to MPE limitations, fading, blockage, or the like.

The base station 205-b may determine to transmit a beam switch signal to the UE 215-b on an active communication beam 220-a during TTI 420-a. In an example, the active communication beam 220-a may be a downlink transmit beam. For example, the base station 205-b may transmit a beam switch signal in a MAC-CE on a PDSCH. The UE 215-b may receive the beam switch command on an active communication beam 225-a during TTI 420-a. In an example, the active communication beam 225-a may be a downlink receive beam.

In some cases, the UE 215-b may be unable to successfully decode the beam switch signal. The unsuccessful decoding of the beam switch signal may be an outcome of a CRC failure. For example, CRC bits of a PDSCH and/or data carrying the MAC-CE that includes the beam switch signal may not match a CRC value calculated by the UE 215-b. As a result, the UE 215-b may be unable to perform the requested beam switch.

In some cases, the base station 205-b may proceed to switch its own communication beam, for example, from communication beam 220-a to communication beam 220-b during TTI 420-h, expecting that the UE 215-b successfully decoded the beam switch signal and switching uplink control beams as instructed. When the beam switch signal is not successfully decoded, the UE 215-b may transmit feedback (e.g., NACK) for the beam switch signal during TTI 420-j using the active communication beam 225-a because the UE 215-b did not yet switch to communication beam 225-b. In this example, the active communication beam 225-a may be an uplink transmit beam (e.g., PUCCH, PUSCH).

After receiving the feedback (e.g., NACK) from the UE 215-b, the base station 205-b may re-transmit the beam switch signal to the UE 215-b during TTI 420-m. This time, the UE 215-b may successfully decode a MAC-CE carrying the beam switch signal. The base station 205-b and the UE 215-b may switch an active communication beam at TTI 420-t, as part of a beam switch procedure, following the decoding of the beam switch signal. For example, the base station 205-b may switch from an active communication beam 220-a to an active communication beam 220-b. Similarly, the UE 215-b may switch from an active communication beam 225-a to an active communication beam 225-b.

The beam switch signal may also carry a grant allocating resources for transmitting feedback for the beam switch signal (e.g., MAC-CE). For example, the feedback may be scheduled to be transmitted on the active communication beam 225-b using resources of the resource set, after a preconfigured number of TTIs (e.g., $K_0$) following the beam switch procedure, such that UE 215-b may have had time to switch active communication beams. After the preconfigured number of TTIs (e.g., $K_0$) following the beam switch procedure, the UE 215-b may transmit a feedback related to the beam switch signal to the base station 205-b on the active communication beam 225-b (e.g., new uplink transmit beam) during TTI 420-v.

As a result, the described techniques provides an efficient mechanism where the UE 215-b can transmit feedback for a beam switch signal that resulted in an unsuccessful decoding using a current communication beam, and transmit feedback for a re-transmitted beam switch signal that resulted in a successful decoding using a new communication beam.

Figure 5:
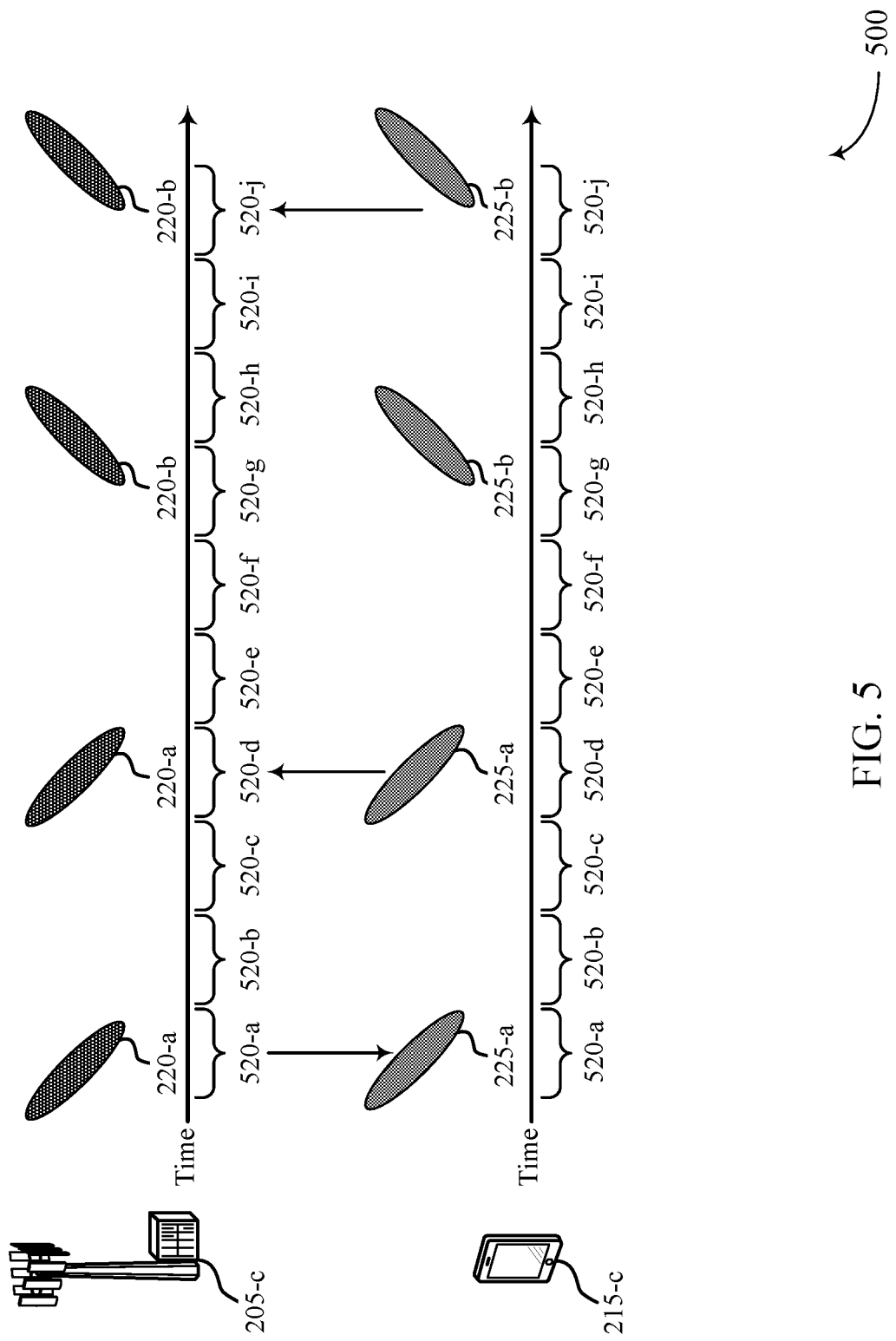

FIG. 5 illustrates an example of a timeline 500 that supports uplink control channel beam switch procedure in accordance with aspects of the present disclosure. In some examples, the timeline 500 may implement aspects of the wireless communication system 100 and 200. The timeline 500 may support handling feedback (acknowledgment/non-acknowledgment) signaling related to a beam switch procedure to enhance communications efficiency and reduce latency in a wireless communication system.

The timeline 500 may include a base station 205-c and a UE 215-c, which may be examples of the corresponding devices described with reference to FIGS. 1 through 4. The timeline 500 may illustrate an example scenario showing multiple PUCCH repetitions. Additionally, the timeline 500 may illustrate an example scenario where the base station 205-*c* instructs the UE 215-*c* to transmit feedback (e.g., ACK) via two communication beams (e.g., in an old communication beam and a new switched communication beam), for robustness and latency improvement.

The timeline 500 may be expressed in multiples of a basic time unit, which may, for example, refer to a TTI (e.g., TTI 520-*a* through 520-*v*). A TTI may include one or more subframes, slots, frames, or the like. Each slot may contain, for example, 14 modulation symbol periods (e.g., OFDM symbols). In some cases, a TTI or a slot may be a scheduling unit in a wireless communication system.

The base station 205-*c* may determine that an active communication beam is below an acceptable performance threshold during TTI 520-*a*. For example, the active communication beam may degrade due to blocking, fading, MPE limitations, or the like. The base station 205-*c* may determine to transmit a beam switch signal to the UE 215-*c* on an active communication beam 220-*a* during TTI 520-*a*. For example, the base station 205-*c* may transmit the beam switch signal in a MAC-CE on the active communication beam 220-*a* (e.g., a PDSCH). The beam switch signal may instruct the UE 215-*c* to switch communication beams.

The UE 215-*c* may receive the beam switch signal on an active communication beam 225-*a* during TTI 520-*a*. After successfully decoding the MAC-CE carrying the beam switch signal, and prior to performing a beam switch procedure, the UE 215-*c* may transmit feedback for the beam switch signal using a current communication beam. For example, the UE 215-*c* may transmit an acknowledgment for the MAC-CE carrying the beam switch signal on the active communication beam 225-*a* during TTI 520-*d*.

A beam switch procedure may occur during TTI 520-*g*, in which the UE 215-*c* and the base station 205-*c* switch active communication beams. For example, the UE 215-*c* may switch from communication beam 225-*a* to communication beam 225-*b*. The UE 215-*c* may transmit an additional feedback for the beam switch signal using a new communication beam. For example, the UE 215-*c* may transmit an ACK, for the MAC-CE carrying the beam switch signal, on the active communication beam 225-*b* during TTI 520-*j*.

The additional feedback may be scheduled to be transmitted on the active communication beam 225-*b* using resources of a resource set, after a preconfigured number of TTIs (e.g., $K_0$) following the beam switch procedure, such that UE 215-*c* may have had time to switch active communication beams. The resources for the additional feedback on the active communication beam 225-*b* can also indicated via the MAC-CE. Additionally, or alternatively, the resources for the additional feedback can be indicated in a grant via DCI. Further transmissions between the base station 205-*c* and the UE 215-*c* may occur using the new active communication beams 220-*b* and 225-*b*. As a result, the described techniques provides an efficient mechanism for the UE 215-*c* to transmit multiple feedback for a beam switch signal using multiple communication beams.

Figure 6:
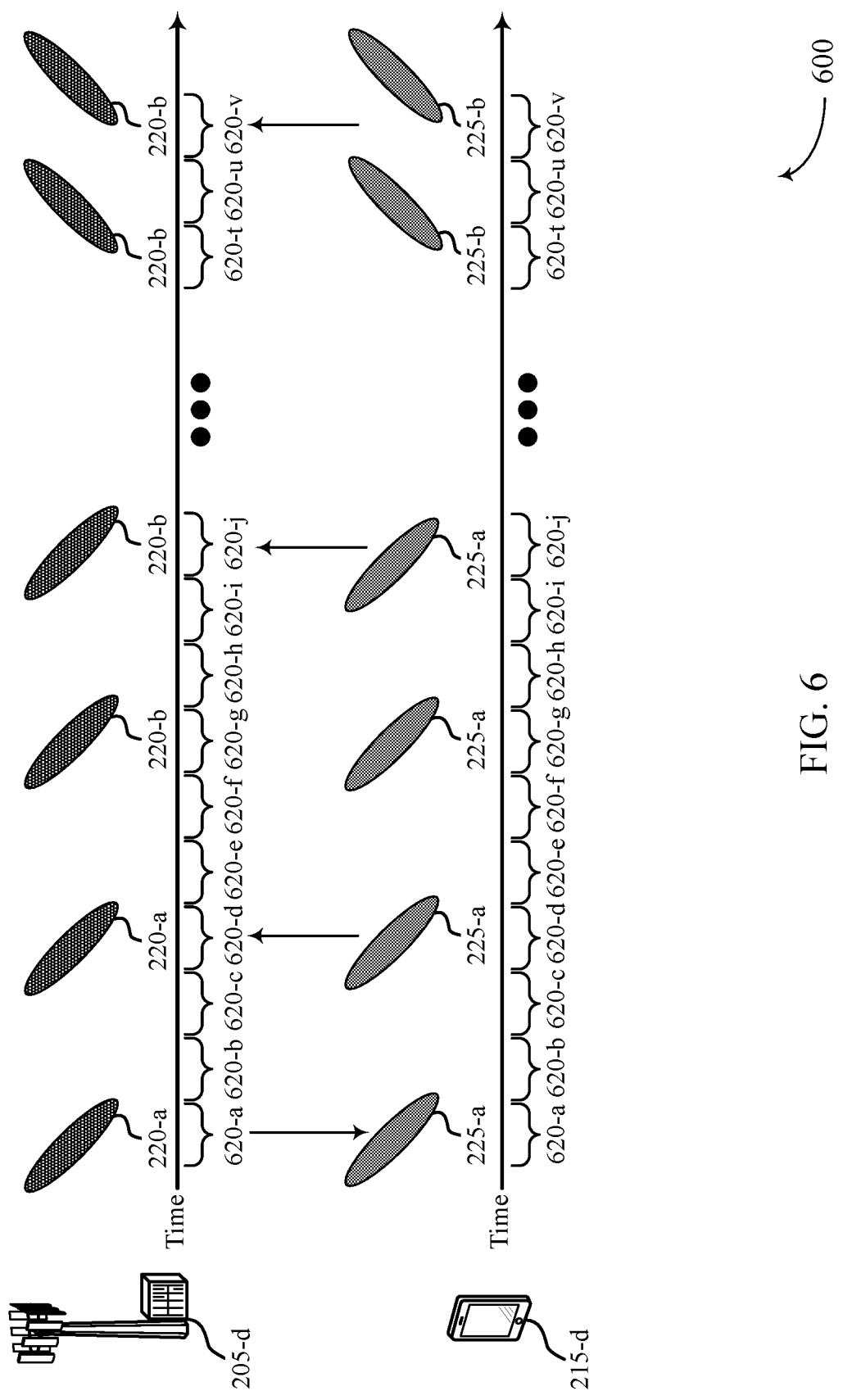

FIG. 6 illustrates an example of a timeline 600 that supports uplink control channel beam switch procedure in accordance with aspects of the present disclosure. In some examples, the timeline 600 may implement aspects of the wireless communication system 100 and 200. The timeline 600 may support handling feedback (ACK/NACK) signaling related to a beam switch procedure to enhance communications efficiency and reduce latency in a wireless communication system.

The timeline 600 may include a base station 205-*d* and a UE 215-*d*, which may be examples of the corresponding devices described with reference to FIGS. 1 through 5. The timeline 600 may illustrate an example scenario showing multiple PUCCH repetitions for a CRC fail occasion. The timeline 600 may be expressed in multiples of a basic time unit, which may, for example, refer to a TTI (e.g., TTI 620-*a* through 620-*v*). A TTI may include one or more subframes, slots, frames, or the like. Each slot may contain, for example, 14 modulation symbol periods (e.g., OFDM symbols). In some cases, a TTI (e.g., a slot) may be a scheduling unit in a wireless communication system.

The base station 205-*d* may determine that an active communication beam is below an acceptable performance threshold during TTI 620-*a*. For example, the active communication beam may degrade due to blockage, fading, MPE limitations, or the like. The base station 205-*d* may determine to transmit a beam switch signal to the UE 215-*d* on an active communication beam 220-*a* based on the degradation during TTI 620-*a*. The base station 205-*d* may transmit the beam switch signal in a MAC-CE on the active communication beam 220-*a* (e.g., PDSCH).

The UE 215-*d* may receive the beam switch signal in the MAC-CE on an active communication beam 225-*a* during TTI 620-*a*. In some cases, after receiving the beam switch signal the UE 215-*d* may be unable to successfully decode the beam switch signal. The unsuccessful decoding of PDSCH and/or data carrying the beam switch signal may be determined by a CRC failure. That is, the UE 215-*d* may be unable to perform the requested beam switch. The UE 215-*d* may transmit feedback (e.g., a NACK) for the beam switch signal during TTI 620-*d* using the active communication beam 225-*a*.

The base station 205-*d* may receive the feedback and re-transmit, to the UE 215-*d* a second beam switch signal during TTI 620-*g*. In this case, the UE 215-*d* may receive and successfully decode the beam switch signal. After decoding the beam switch signal, the UE 215-*d* may transmit feedback (e.g., acknowledgement) of the beam switch signal during TTI 620-*j* using the active communication beam 225-*a* based on resources allocated to the UE 215-*d* for uplink transmission.

A beam switch procedure may occur during TTI 620-*t*, in which the UE 215-*d* and the base station 205-*d* switch active communication beams. For example, the UE 215-*d* may switch from communication beam 225-*a* to communication beam 225-*b*. The UE 215-*d* may transmit another feedback for the beam switch command using a new communication beam. For example, the UE 215-*d* may transmit an ACK for the second beam switch signal, on the active communication beam 225-*b* during TTI 620-*v*. The additional feedback transmission may be scheduled to be transmitted on the active communication beam 225-*b* using resources of a resource set, after a preconfigured number of TTIs (e.g., $K_0$) following the beam switch procedure, such that UE 215-*d* may have had time to switch active communication beams.

The described techniques provides an efficient mechanism for the UE 215-*d* to transmit multiple feedback for multiple beam switch signals using different communication beams across multiple TTIs.

Figure 7:
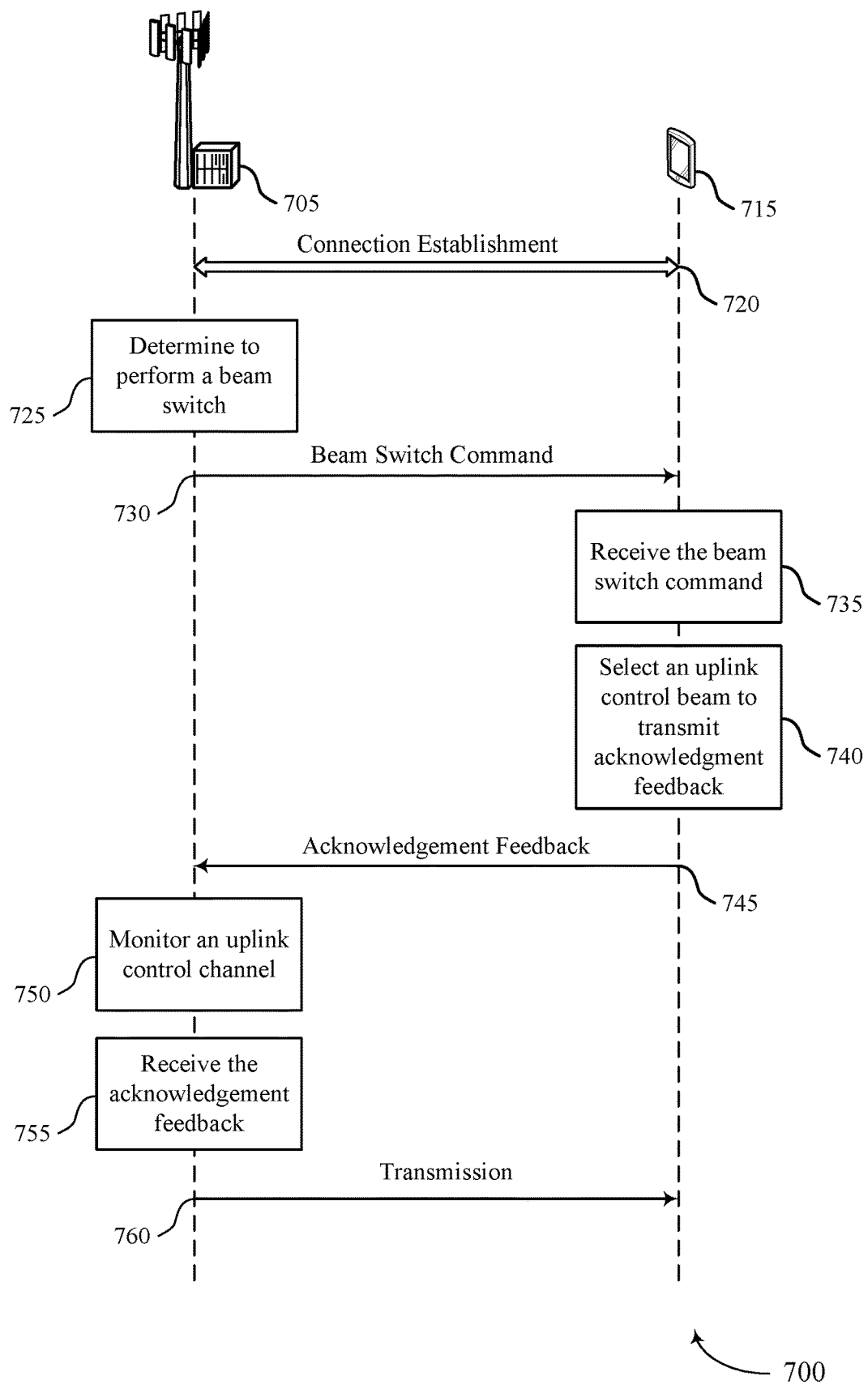
FIG. 7 illustrates an example of a process flow that supports uplink control channel beam switch procedure in accordance with aspects of the present disclosure.

FIG. 7 illustrates an example of a process flow 700 that supports uplink control channel beam switch procedure in accordance with aspects of the present disclosure. In some examples, the process flow 700 may implement aspects of the wireless communication system 100 and 200. Base station 705 and UE 715 may be examples of the corresponding devices described with reference to FIGS. 1 through 6.

In the following description of the process flow 700, the operations between the base station 705 and the UE 715 may be transmitted in a different order than the example order shown, or the operations performed by the base station 705 and the UE 715 may be performed in different orders or at different times. Certain operations may also be left out of the process flow 700, or other operations may be added to the process flow 700.

At 720, the base station 705 and the UE 715 may establish a connection. For example, the base station 705 may perform a RRC procedure (e.g., cell acquisition procedure, random access procedure, RRC connection procedure, RRC configuration procedure) with the UE 715. The base station 705 may be configured with multiple antennas, which may be used for directional or beamformed transmissions (e.g., beamformed communication beams). Similarly, the UE 715 may be configured with multiple antennas, which may be used for directional or beamformed transmissions (e.g., beamformed communication beams). The base station 705 and the UE 715 may have at least one active communication beam that is being used for wireless communications, as a result of the RRC procedure.

At 725, the base station 705 may determine to perform a beam switch. For example, the base station 705 may detect degraded performance of a first uplink control beam, and determine to have the UE 715 switch from the first uplink control beam to a second uplink control beam.

At 730, the base station 705 may transmit a beam switch command to the UE 715 instructing the UE 715 to switch from the first uplink control beam to the second uplink control beam.

At 735, the UE 715 may receive the beam switch command. In some examples, the UE 715 may receive a MAC CE or a DCI including the beam switch command. The UE 715 may receive the beam switch command in a downlink shared data channel e.g., PDSCH. The UE 715 may, additionally or alternatively, receive a grant of resources for an uplink control channel for transmitting an acknowledgment feedback. Prior to receiving the beam switch command, the UE 715 may also receive a grant scheduling the beam switch command in the downlink shared data channel.

At 740, the UE 715 may select an uplink control beam to transmit acknowledgment feedback. In some cases, the UE 715 may select the uplink control beam based on whether decoding the beam switch command is successful.

At 745, the UE 715 may transmit the acknowledgment feedback to the base station 705. In some examples, the UE 715 may transmit the acknowledgment feedback in an uplink control channel (e.g., PUCCH) via the first uplink control beam when unable to successfully decode the beam switch command. In some examples, the UE 715 may transmit the acknowledgment feedback in the second uplink control beam based on successfully decoding the beam switch command. In some cases, the UE 715 may identify a second TTI to transmit the acknowledgment feedback that occurs after a first TTI based on successfully decoding the beam switch command, and determine not to transmit the acknowledgment feedback via the first uplink control beam during the first TTI.

At 750, the base station 705 may monitor an uplink control channel for acknowledgment feedback via the first uplink control beam or the second uplink control beam. At 755, the base station 705 may receive the acknowledgment feedback.

At 760, the base station 705 may transmit a transmission to the UE 715 based on the monitoring. For example, the base station 705 may transmit a transmission to the UE 715 based on which of the first uplink control beam or the second uplink control beam was used to transmit the acknowledgment feedback. The base station 705 may monitor an earlier TTI for an ACK or a NACK when the UE 715 transmits feedback using the first uplink control beam. The base station 705 may monitor a later TTI for an ACK when the UE 715 transmits feedback using the first uplink control beam, instead or in addition to transmitting an ACK using the second control beam.

Beneficially, the UE may use a new, second uplink control beam for sending the acknowledgment feedback in the uplink control channel. The new, second uplink control beam is expected to be associated with better conditions over a wireless channel than the first uplink control beam, thereby increasing the likelihood of successful receipt of the acknowledgment feedback by the base station.

Figure 8:
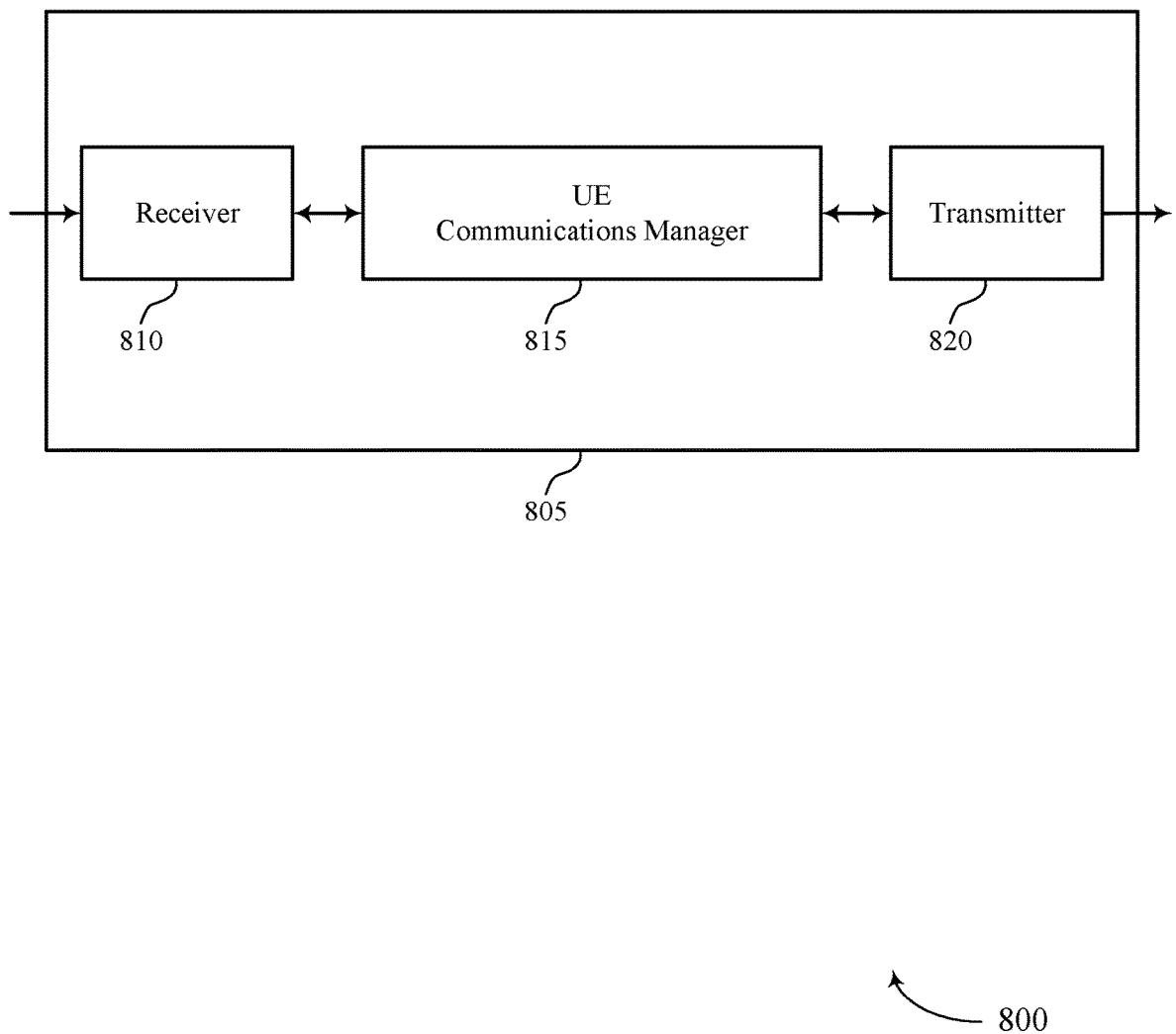
FIGS. 8 and 9 show block diagrams of devices that support uplink control channel beam switch procedure in accordance with aspects of the present disclosure.

FIG. 8 shows a block diagram 800 of a device 805 that supports uplink control channel beam switch procedure in accordance with aspects of the present disclosure. The device 805 may be an example of aspects of a UE as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink control channel beam switch procedure, etc.). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may receive, in a downlink shared data channel, a beam switch command instructing the UE to switch from a first uplink control beam to a second uplink control beam, select an uplink control beam to transmit acknowledgment feedback based on whether decoding the beam switch command is successful, and transmit, in an uplink control channel via the selected uplink control beam, the acknowledgment feedback indicating whether decoding the beam switch command was successful. The UE communications manager 815 may be an example of aspects of the UE communications manager 1110 described herein.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
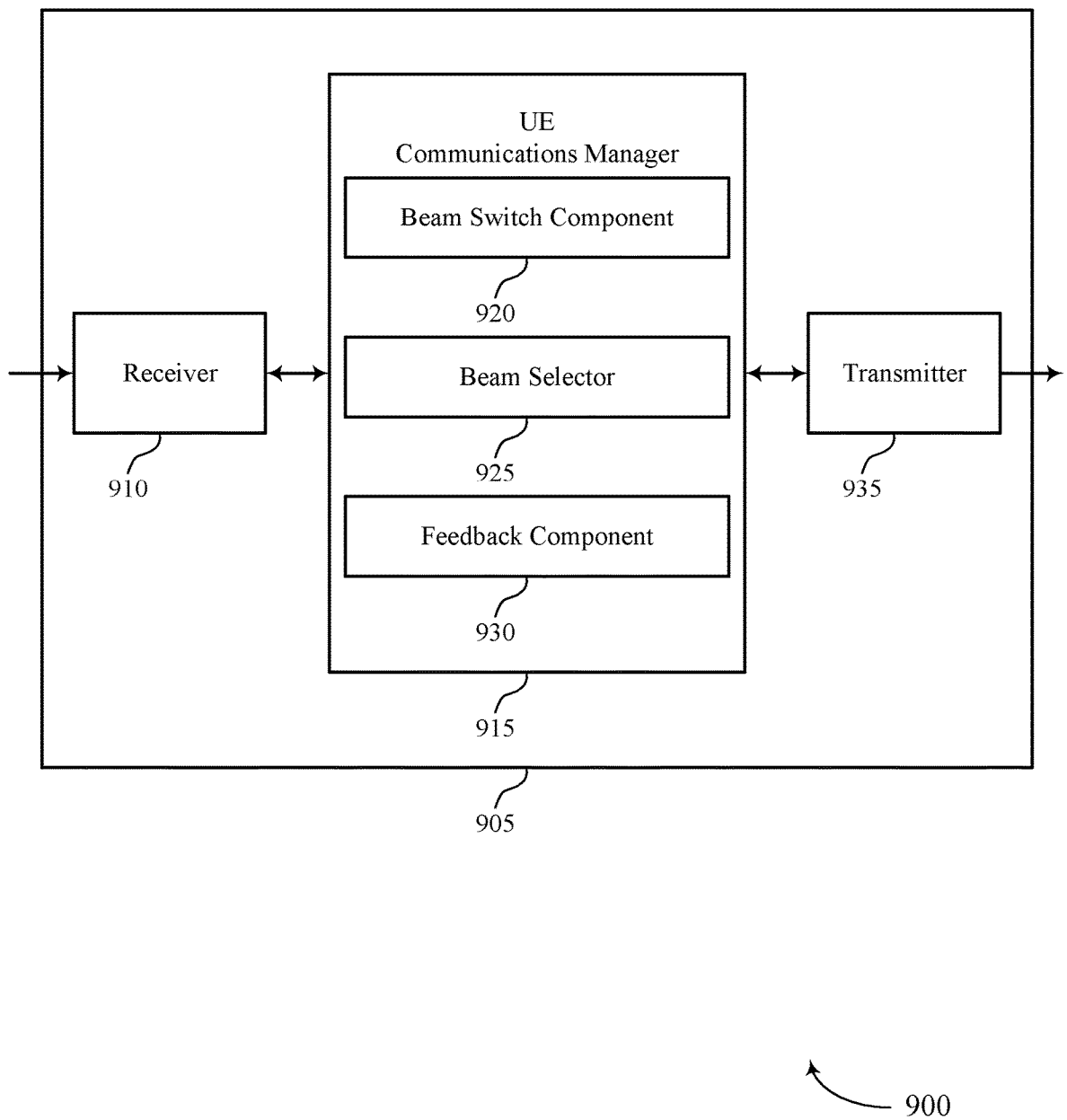

FIG. 9 shows a block diagram 900 of a device 905 that supports uplink control channel beam switch procedure in accordance with aspects of the present disclosure. The device 905 may be an example of aspects of a device 805 or a UE as described herein. The device 905 may include a receiver 910, a UE communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to uplink control channel beam switch procedure, etc.). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a beam switch component 920, a beam selector 925, and a feedback component 930. The UE communications manager 915 may be an example of aspects of the UE communications manager 1110 described herein.

The beam switch component 920 may receive, in a downlink shared data channel, a beam switch command instructing the UE to switch from a first uplink control beam to a second uplink control beam. The beam selector 925 may select an uplink control beam to transmit acknowledgment feedback based on whether decoding the beam switch command is successful. The feedback component 930 may transmit, in an uplink control channel via the selected uplink control beam, the acknowledgment feedback indicating whether decoding the beam switch command was successful.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
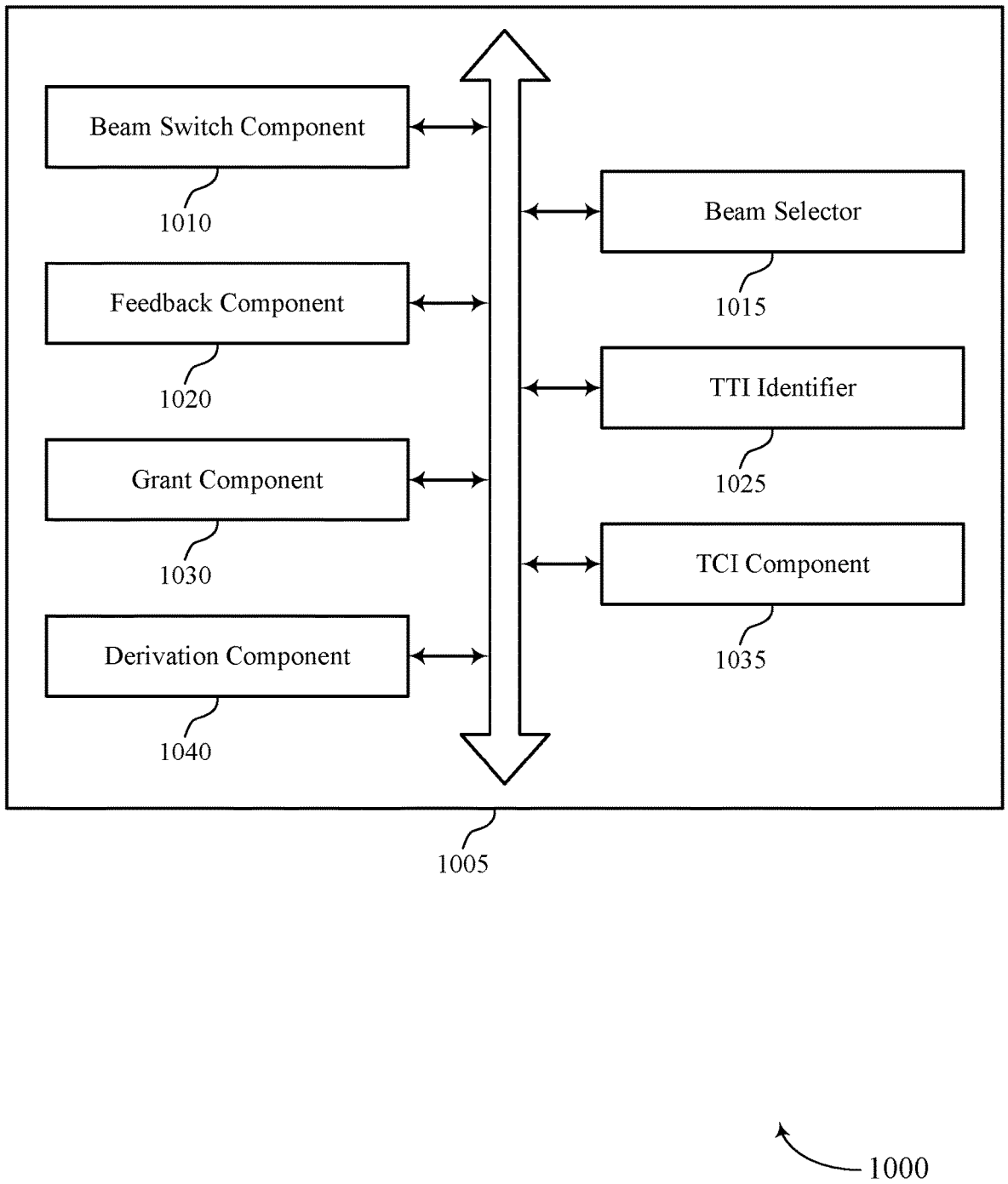
FIG. 10 shows a block diagram of a device that supports uplink control channel beam switch procedure in accordance with aspects of the present disclosure.

FIG. 10 shows a block diagram 1000 of a UE communications manager 1005 that supports uplink control channel beam switch procedure in accordance with aspects of the present disclosure. The UE communications manager 1005 may be an example of aspects of a UE communications manager 815, a UE communications manager 915, or a UE communications manager 1110 described herein. The UE communications manager 1005 may include a beam switch component 1010, a beam selector 1015, a feedback component 1020, a TTI identifier 1025, a grant component 1030, a TCI component 1035, and a derivation component 1040.

Each of these modules may communicate, directly or indirectly, with one another (e.g., via one or more buses).

The beam switch component 1010 may receive, in a downlink shared data channel, a beam switch command instructing the UE to switch from a first uplink control beam to a second uplink control beam. In some examples, the beam switch component 1010 may receive, in the downlink shared data channel, a second beam switch command instructing the UE to switch from the first uplink control beam to the second uplink control beam. In some examples, the beam switch component 1010 may receive a medium access control (MAC) control element (CE) including the beam switch command. In some examples, the beam switch component 1010 may receive downlink control information including the beam switch command. In some examples, the beam switch component 1010 may receive the beam switch command in the downlink shared data channel via a receive beam.

The beam selector 1015 may select an uplink control beam to transmit acknowledgment feedback based on whether decoding the beam switch command is successful. In some examples, the beam selector 1015 may select the second uplink control beam to transmit the acknowledgment feedback based on successfully decoding the beam switch command. In some examples, the beam selector 1015 may select each of the first uplink control beam and the second uplink control beam to transmit the acknowledgment feedback based on successfully decoding the beam switch command. In some examples, the beam selector 1015 may select the first uplink control beam to transmit the acknowledgment feedback based on failing to successfully decode the beam switch command. In some examples, the beam selector 1015 may select the first uplink control beam, the second uplink control beam, or both, to transmit second acknowledgment feedback based on whether decoding the second beam switch command is successful.

The feedback component 1020 may transmit, in an uplink control channel via the selected uplink control beam, the acknowledgment feedback indicating whether decoding the beam switch command was successful. In some examples, the feedback component 1020 may transmit, in the uplink control channel via the second uplink control beam, the acknowledgment feedback during the second TTI. In some examples, the feedback component 1020 may transmit, in the uplink control channel via the first uplink control beam, the acknowledgment feedback in a first TTI. In some examples, the feedback component 1020 may transmit, in the uplink control channel via the second uplink control beam, the acknowledgment feedback in a second TTI that occurs after the first TTI. In some examples, the feedback component 1020 may transmit, in the uplink control channel via the first uplink control beam, the acknowledgment feedback during the first TTI. In some examples, the feedback component 1020 may transmit, in the uplink control channel via the first uplink control beam, the second uplink control beam, or both, the second acknowledgment feedback indicating whether decoding the second beam switch command was successful.

The TTI identifier 1025 may identify a second TTI to transmit the acknowledgment feedback that occurs after a first TTI based on successfully decoding the beam switch command. In some examples, the TTI identifier 1025 may determine not to transmit the acknowledgment feedback via the first uplink control beam during the first TTI. In some examples, the TTI identifier 1025 may identify a first TTI to transmit the acknowledgment feedback that occurs prior to a second TTI based on failing to successfully decode the beam switch command.

The grant component 1030 may receive a grant of resources for the uplink control channel for transmitting the acknowledgment feedback during the second TTI. In some examples, the grant component 1030 may receive a grant of resources for the uplink control channel for transmitting the acknowledgment feedback. In some examples, the grant component 1030 may receive, in a downlink control channel via a downlink control receive beam, a grant scheduling the beam switch command in the downlink shared data channel.

The TCI component 1035 may receive control signaling configuring the set of different TCI states. The derivation component 1040 may derive the first uplink control beam from the downlink control receive beam.

Figure 11:
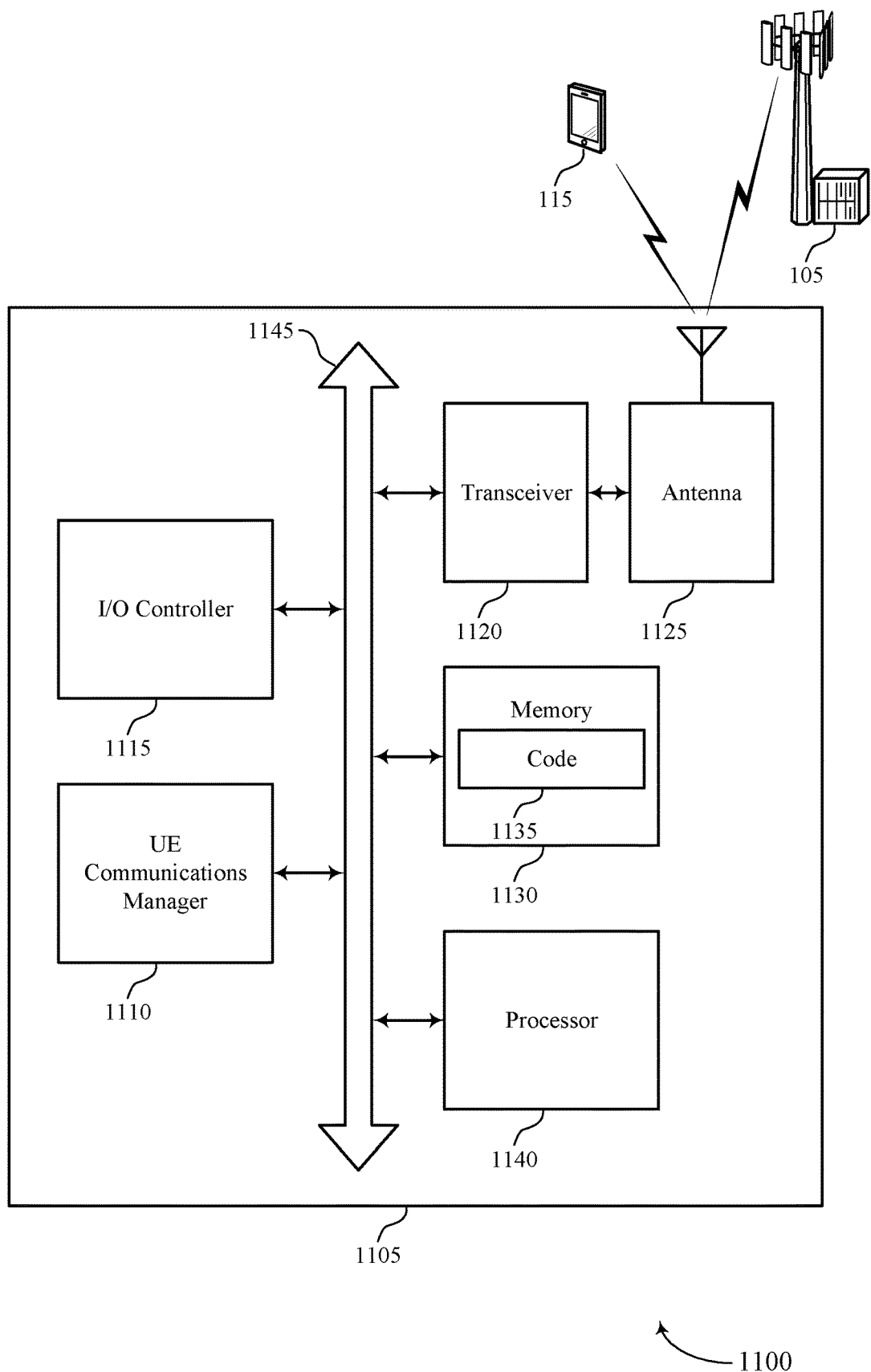
FIG. 11 shows a diagram of a system including a device that supports uplink control channel beam switch procedure in accordance with aspects of the present disclosure.

FIG. 11 shows a diagram of a system 1100 including a device 1105 that supports uplink control channel beam switch procedure in accordance with aspects of the present disclosure. The device 1105 may be an example of or include the components of device 805, device 905, or a UE as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may receive, in a downlink shared data channel, a beam switch command instructing the UE to switch from a first uplink control beam to a second uplink control beam, select an uplink control beam to transmit acknowledgment feedback based on whether decoding the beam switch command is successful, and transmit, in an uplink control channel via the selected uplink control beam, the acknowledgment feedback indicating whether decoding the beam switch command was successful.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink control channel beam switch procedure).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
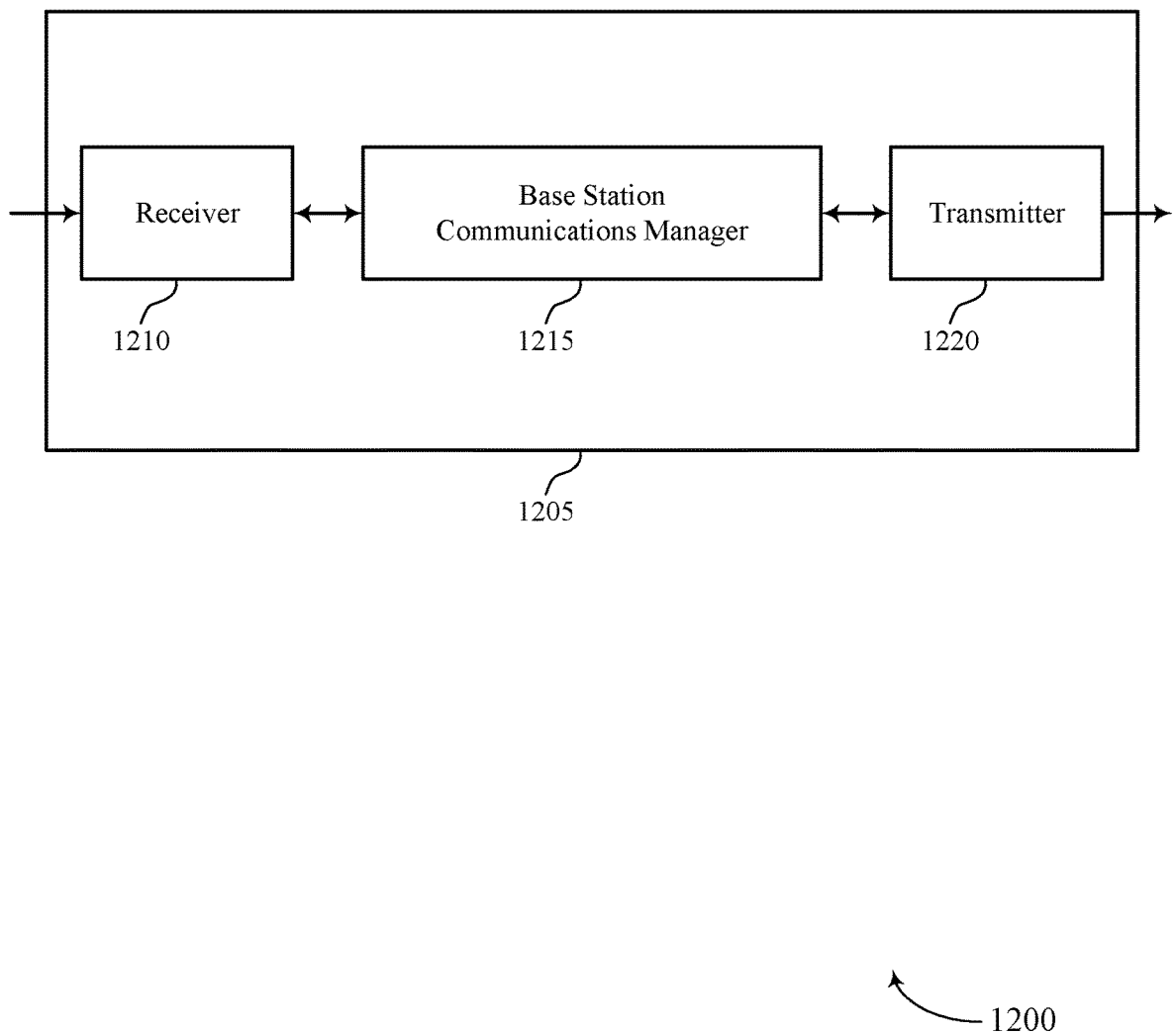
FIGS. 12 and 13 show block diagrams of devices that support uplink control channel beam switch procedure in accordance with aspects of the present disclosure.

FIG. 12 shows a block diagram 1200 of a device 1205 that supports uplink control channel beam switch procedure in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to uplink control channel beam switch procedure, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may transmit, in a downlink shared data channel, a beam switch command instructing a UE to switch from a first uplink control beam to a second uplink control beam, monitor an uplink control channel for acknowledgment feedback via the first uplink control beam or the second uplink control beam, the acknowledgment feedback indicating whether decoding the beam switch command was successful, and transmit a transmission to the UE based on which of the first uplink control beam or the second uplink control beam was used to transmit the acknowledgment feedback. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an ASIC, an FPGA or other PLD, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
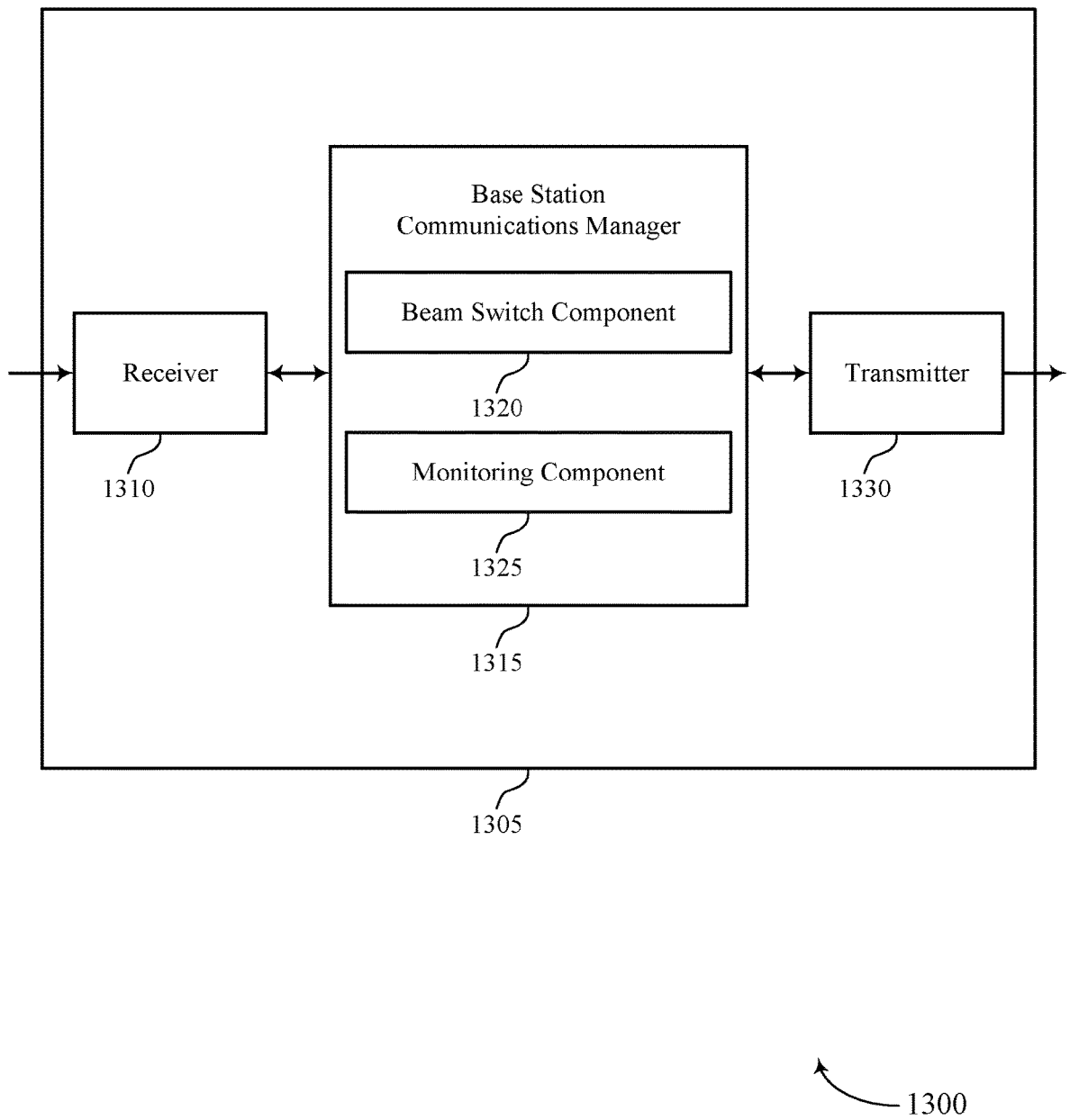

FIG. 13 shows a block diagram 1300 of a device 1305 that supports uplink control channel beam switch procedure in accordance with aspects of the present disclosure. The device 1305 may be an example of aspects of a device 1205 or a base station 105 as described herein. The device 1305 may include a receiver 1310, a base station communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to uplink control channel beam switch procedure, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a beam switch component 1320 and a monitoring component 1325. The base station communications manager 1315 may be an example of aspects of the base station communications manager 1510 described herein.

The beam switch component 1320 may transmit, in a downlink shared data channel, a beam switch command instructing a UE to switch from a first uplink control beam to a second uplink control beam. The monitoring component 1325 may monitor an uplink control channel for acknowledgment feedback via the first uplink control beam or the second uplink control beam, the acknowledgment feedback indicating whether decoding the beam switch command was successful.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas. The transmitter 1330 may transmit a transmission to the UE based on which of the first uplink control beam or the second uplink control beam was used to transmit the acknowledgment feedback.

Figure 14:
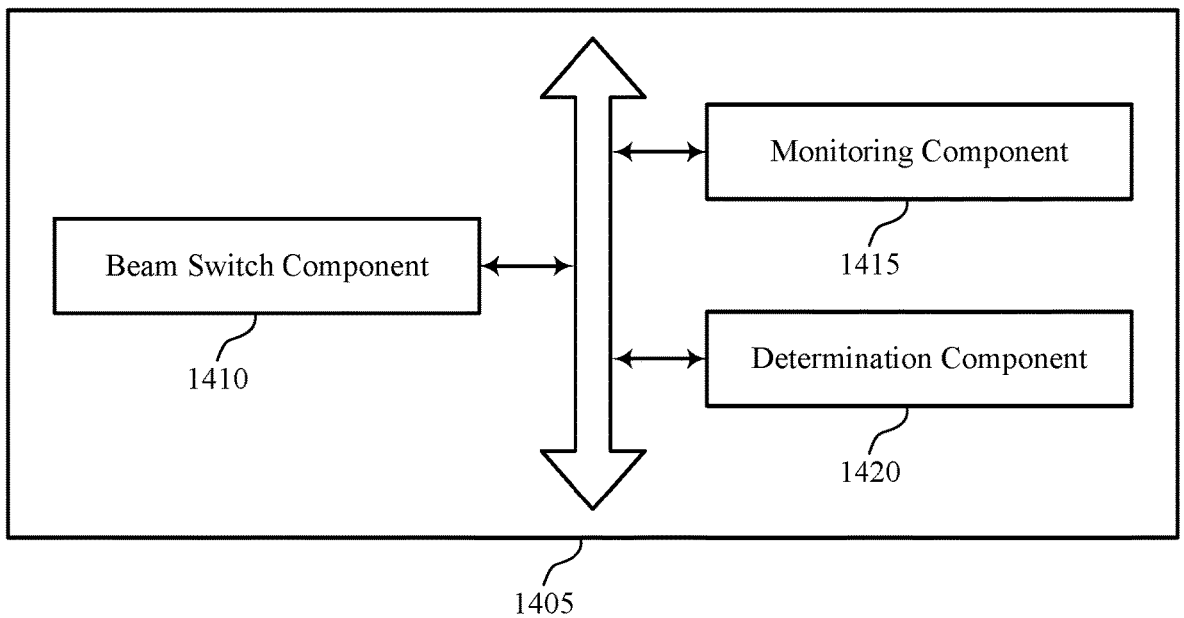
FIG. 14 shows a block diagram of a device that supports uplink control channel beam switch procedure in accordance with aspects of the present disclosure.

FIG. 14 shows a block diagram 1400 of a base station communications manager 1405 that supports uplink control channel beam switch procedure in accordance with aspects of the present disclosure. The base station communications manager 1405 may be an example of aspects of a base station communications manager 1215, a base station communications manager 1315, or a base station communications manager 1510 described herein. The base station communications manager 1405 may include a beam switch component 1410, a monitoring component 1415, and a determination component 1420. Each of these modules may communicate, directly or indirectly, with one another (e.g., via one or more buses).

The beam switch component 1410 may transmit, in a downlink shared data channel, a beam switch command instructing a UE to switch from a first uplink control beam to a second uplink control beam.

The monitoring component 1415 may monitor an uplink control channel for acknowledgment feedback via the first uplink control beam or the second uplink control beam. In some examples, the acknowledgment feedback may indicate whether decoding of the beam switch command was successful. The monitoring component 1415 may monitor the uplink control channel for the acknowledgment feedback during a first TTI that occurs prior to a second TTI. The first TTI may correspond to the UE failing to successfully decode the beam switch command. In some examples, the monitoring component 1415 may monitor the uplink control channel for the acknowledgment feedback during a second TTI that occurs after a first TTI. The second TTI may correspond to the UE successfully decoding the beam switch command.

The determination component 1420 may determine that the second uplink control beam was used to transmit the acknowledgment feedback, where the transmission is a data transmission to the UE. In some examples, the determination component 1420 may determine that the first uplink control beam was used to transmit the acknowledgment feedback, where the transmission is a second beam switch command instructing the UE to switch from the first uplink control beam to the second uplink control beam.

Figure 15:
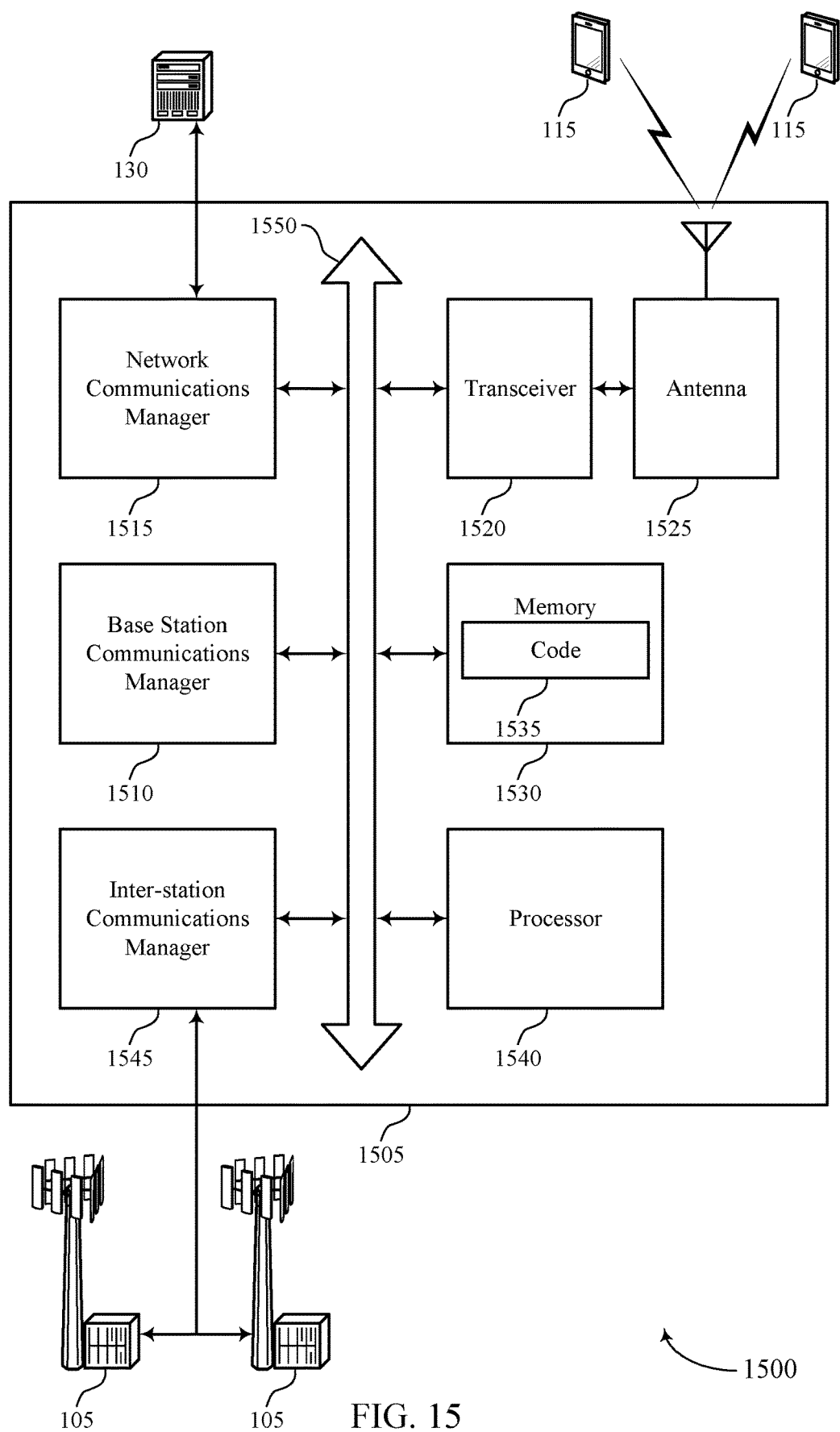
FIG. 15 shows a diagram of a system including a device that supports uplink control channel beam switch procedure in accordance with aspects of the present disclosure.

FIG. 15 shows a diagram of a system 1500 including a device 1505 that supports uplink control channel beam switch procedure in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may transmit, in a downlink shared data channel, a beam switch command instructing a UE to switch from a first uplink control beam to a second uplink control beam, monitor an uplink control channel for acknowledgment feedback via the first uplink control beam or the second uplink control beam, the acknowledgment feedback indicating whether decoding the beam switch command was successful, and transmit a transmission to the UE based on which of the first uplink control beam or the second uplink control beam was used to transmit the acknowledgment feedback.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting uplink control channel beam switch procedure).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
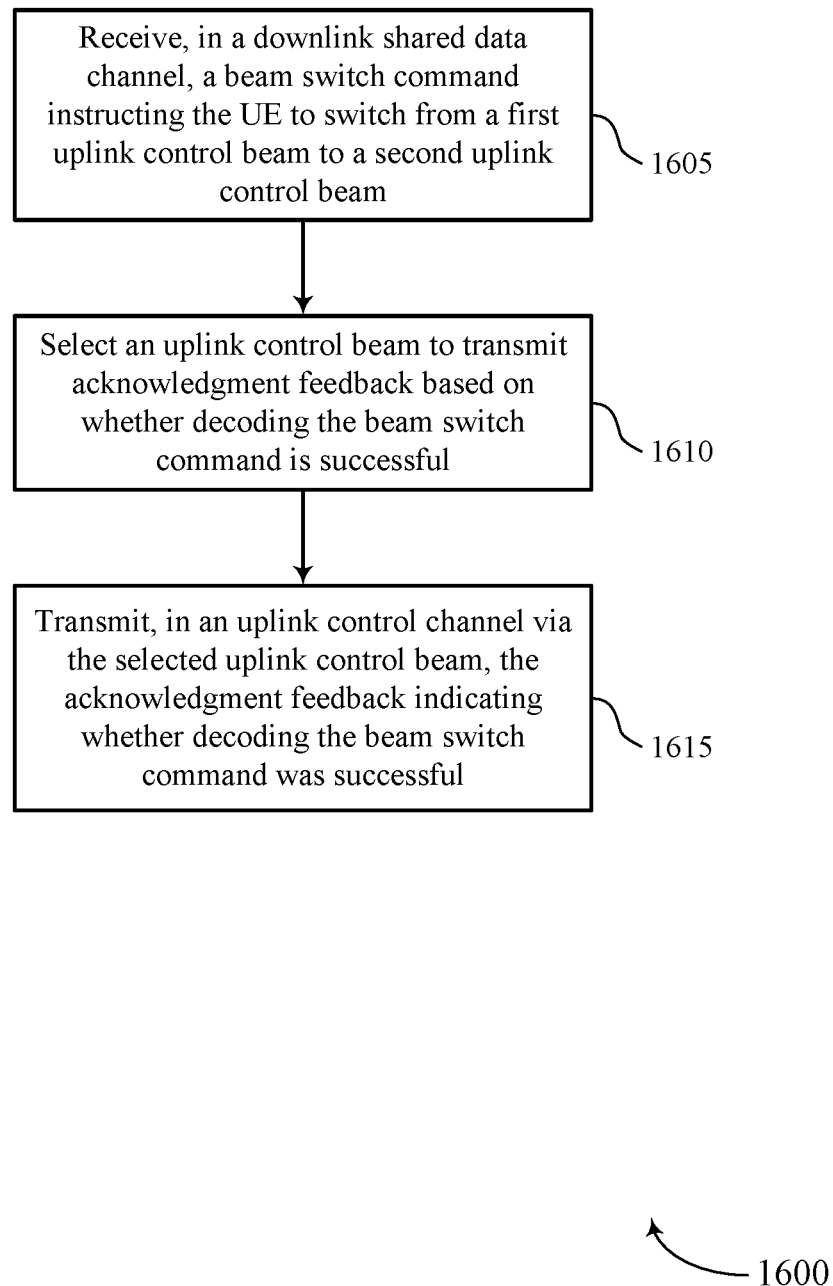
FIGS. 16 through 18 show flowcharts illustrating methods that support uplink control channel beam switch procedure in accordance with aspects of the present disclosure.

FIG. 16 shows a flowchart illustrating a method 1600 that supports uplink control channel beam switch procedure in accordance with aspects of the present disclosure. The operations of method 1600 may be implemented by a UE or its components as described herein. For example, the operations of method 1600 may be performed by a communications manager as described with reference to FIGS. 8 to 11. In some examples, a UE may execute a set of instructions to control the functional elements of the UE to perform the functions described below. Additionally or alternatively, a UE may perform aspects of the functions described below using special-purpose hardware.

At 1605, the UE may receive, in a downlink shared data channel, a beam switch command instructing the UE to switch from a first uplink control beam to a second uplink control beam. The operations of 1605 may be performed according to the methods described herein. In some examples, aspects of the operations of 1605 may be performed by a beam switch component as described with reference to FIGS. 8 to 11.

At 1610, the UE may select an uplink control beam to transmit acknowledgment feedback based on whether decoding the beam switch command is successful. The operations of 1610 may be performed according to the methods described herein. In some examples, aspects of the operations of 1610 may be performed by a beam selector as described with reference to FIGS. 8 to 11.

At 1615, the UE may transmit, in an uplink control channel via the selected uplink control beam, the acknowledgment feedback indicating whether decoding the beam switch command was successful. The operations of 1615 may be performed according to the methods described herein. In some examples, aspects of the operations of 1615 may be performed by a feedback component as described with reference to FIGS. 8 to 11.

Figure 17:
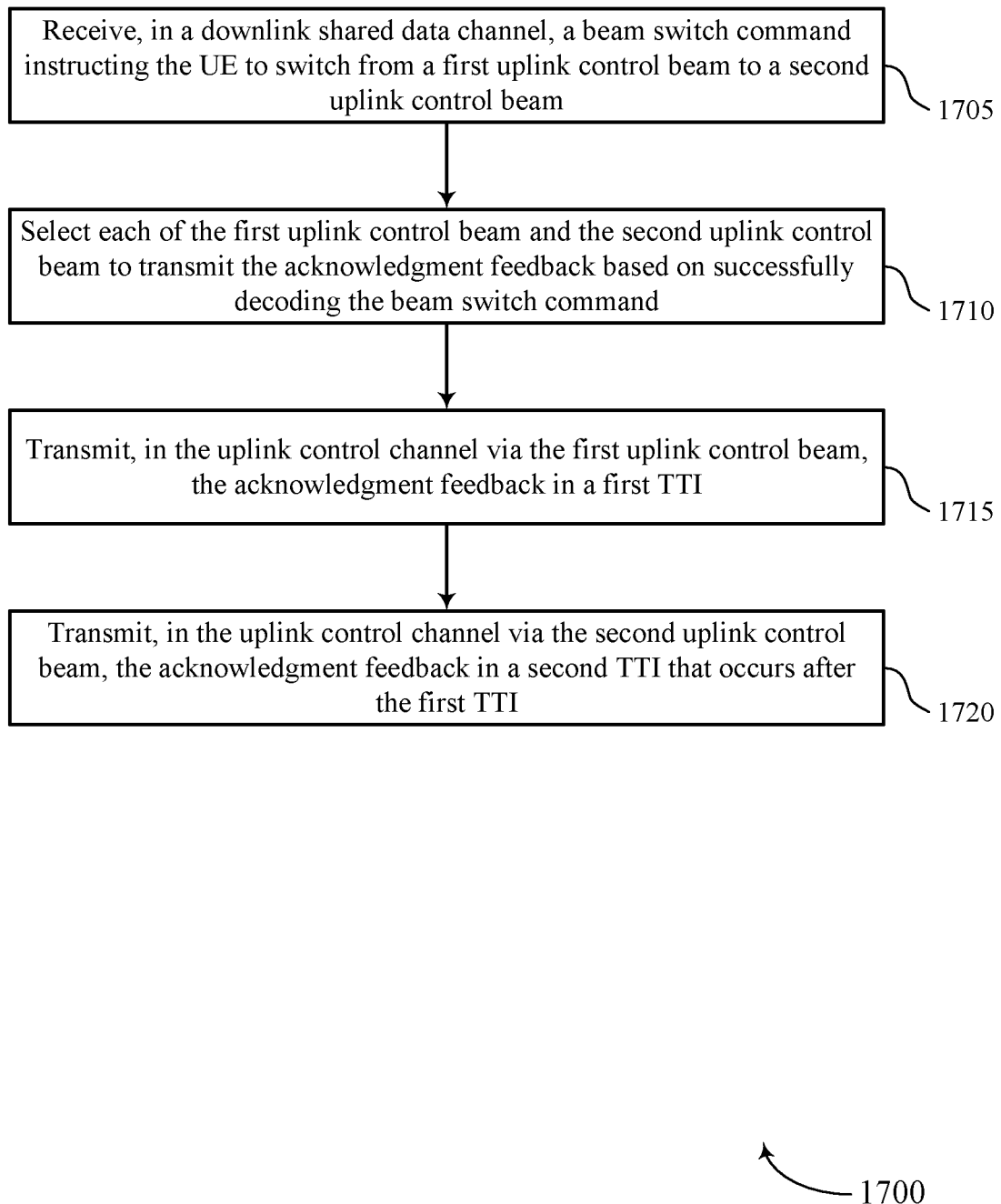

FIG. 17 shows a flowchart illustrating a method 1700 that supports uplink control channel beam switch procedure in accordance with aspects of the present disclosure. The operations of method 1700 may be implemented by a UE or its components as described herein. For example, the operations of method 1700 may be performed by a communications manager as described with reference to FIGS. 8 to 11. In some examples, a UE may execute a set of instructions to control the functional elements of the UE to perform the functions described below. Additionally or alternatively, a UE may perform aspects of the functions described below using special-purpose hardware.

At 1705, the UE may receive, in a downlink shared data channel, a beam switch command instructing the UE to switch from a first uplink control beam to a second uplink control beam. The operations of 1705 may be performed according to the methods described herein. In some examples, aspects of the operations of 1705 may be performed by a beam switch component as described with reference to FIGS. 8 to 11.

At 1710, the UE may select each of the first uplink control beam and the second uplink control beam to transmit the acknowledgment feedback based on successfully decoding the beam switch command. The operations of 1710 may be performed according to the methods described herein. In some examples, aspects of the operations of 1710 may be performed by a beam selector as described with reference to FIGS. 8 to 11.

At 1715, the UE may transmit, in the uplink control channel via the first uplink control beam, the acknowledgment feedback in a first TTI. The operations of 1715 may be performed according to the methods described herein. In some examples, aspects of the operations of 1715 may be performed by a feedback component as described with reference to FIGS. 8 to 11.

At 1720, the UE may transmit, in the uplink control channel via the second uplink control beam, the acknowledgment feedback in a second TTI that occurs after the first TTI. The operations of 1720 may be performed according to the methods described herein. In some examples, aspects of the operations of 1720 may be performed by a feedback component as described with reference to FIGS. 8 to 11.

Figure 18:
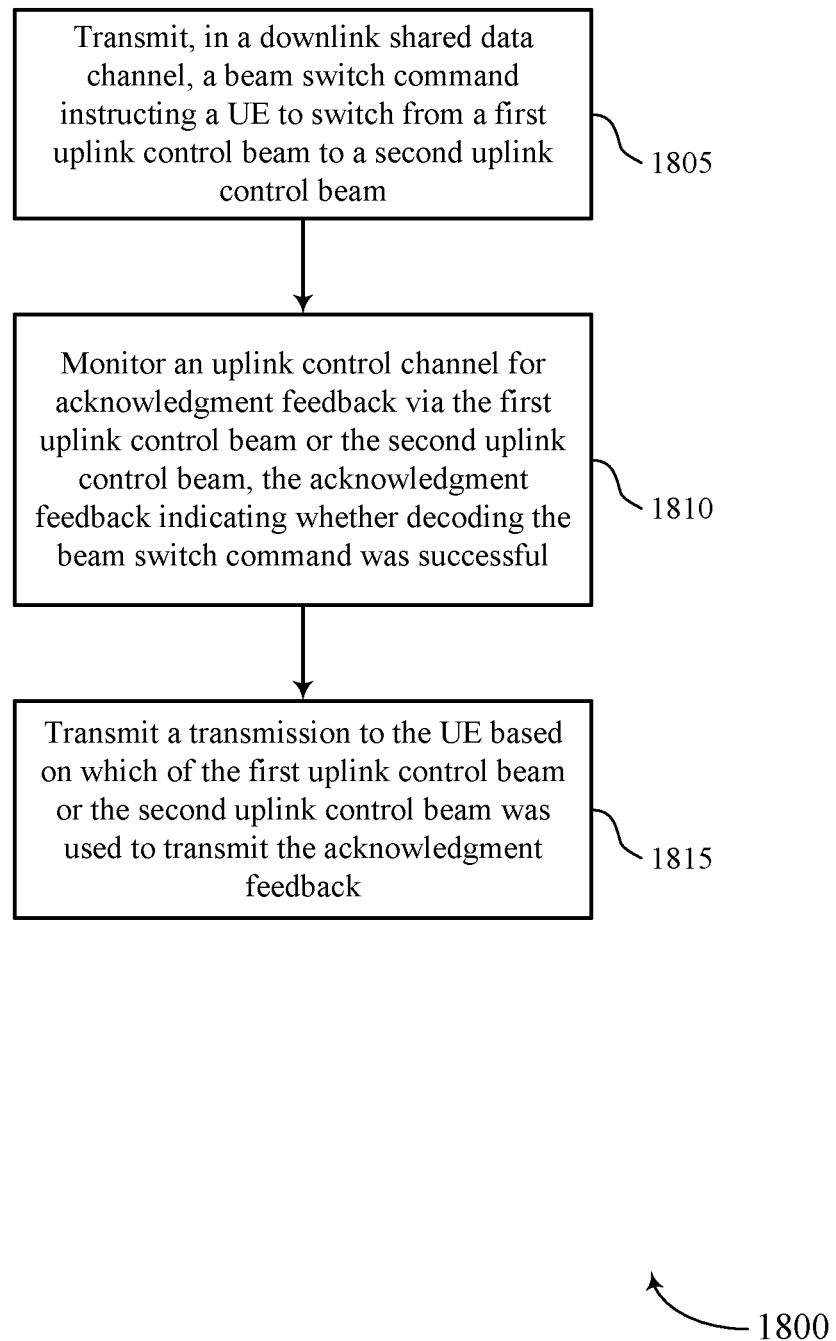

FIG. 18 shows a flowchart illustrating a method 1800 that supports uplink control channel beam switch procedure in accordance with aspects of the present disclosure. The operations of method 1800 may be implemented by a base station 105 or its components as described herein. For example, the operations of method 1800 may be performed by a communications manager as described with reference to FIGS. 12 to 15. In some examples, a base station may execute a set of instructions to control the functional elements of the base station to perform the functions described below. Additionally or alternatively, a base station may perform aspects of the functions described below using special-purpose hardware.

At 1805, the base station may transmit, in a downlink shared data channel, a beam switch command instructing a UE to switch from a first uplink control beam to a second uplink control beam. The operations of 1805 may be performed according to the methods described herein. In some examples, aspects of the operations of 1805 may be performed by a beam switch component as described with reference to FIGS. 12 to 15.

At 1810, the base station may monitor an uplink control channel for acknowledgment feedback via the first uplink control beam or the second uplink control beam, the acknowledgment feedback indicating whether decoding the beam switch command was successful. The operations of 1810 may be performed according to the methods described herein. In some examples, aspects of the operations of 1810 may be performed by a monitoring component as described with reference to FIGS. 12 to 15.

At 1815, the base station may transmit a transmission to the UE based on which of the first uplink control beam or the second uplink control beam was used to transmit the acknowledgment feedback. The operations of 1815 may be performed according to the methods described herein. In some examples, aspects of the operations of 1815 may be performed by a transmitter as described with reference to FIGS. 12 to 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

receiving, in a downlink shared data channel, a beam switch command instructing the UE to switch from a first uplink control beam to a second uplink control beam for transmitting acknowledgement feedback by the UE;

selecting at least one uplink control beam to transmit the acknowledgment feedback based at least in part on whether decoding the beam switch command is successful, wherein each of the first uplink control beam and the second uplink control beam are selected to transmit the acknowledgment feedback based at least in part on successfully decoding the beam switch command; and transmitting, in an uplink control channel via the at least one selected uplink control beam, the acknowledgment feedback indicating whether decoding the beam switch command was successful.

2. The method of claim 1, wherein selecting the at least one uplink control beam to transmit the acknowledgment feedback further comprises:

selecting the second uplink control beam to transmit the acknowledgment feedback based at least in part on successfully decoding the beam switch command.

3. The method of claim 2, wherein transmitting, in the uplink control channel via the at least one selected uplink control beam, the acknowledgment feedback, further comprises:

identifying a second transmission time interval (TTI) to transmit the acknowledgment feedback that occurs after a first TTI based at least in part on successfully decoding the beam switch command;

determining not to transmit the acknowledgment feedback via the first uplink control beam during the first TTI; and transmitting, in the uplink control channel via the second uplink control beam, the acknowledgment feedback during the second TTI.

4. The method of claim 1, wherein transmitting, in the uplink control channel via the at least one selected uplink control beam, the acknowledgment feedback, further comprises:

transmitting, in the uplink control channel via the first uplink control beam, the acknowledgment feedback in a first transmission time interval (TTI); and transmitting, in the uplink control channel via the second uplink control beam, the acknowledgment feedback in a second TTI that occurs after the first TTI.

5. The method of claim 4, wherein receiving the beam switch command further comprises:

receiving a grant of resources for the uplink control channel for transmitting the acknowledgment feedback during the second TTI.

6. The method of claim 1, wherein selecting the at least one uplink control beam to transmit the acknowledgment feedback further comprises:

selecting the first uplink control beam to transmit the acknowledgment feedback based at least in part on failing to successfully decode the beam switch command.

7. The method of claim 6, wherein transmitting, in the uplink control channel via the at least one selected uplink control beam, the acknowledgment feedback, further comprises:

identifying a first transmission time interval (TTI) to transmit the acknowledgment feedback that occurs prior to a second TTI based at least in part on failing to successfully decode the beam switch command; and transmitting, in the uplink control channel via the first uplink control beam, the acknowledgment feedback during the first TTI.

8. The method of claim 7, further comprising:

receiving, in the downlink shared data channel, a second beam switch command instructing the UE to switch from the first uplink control beam to the second uplink control beam;

selecting the first uplink control beam, the second uplink control beam, or both, to transmit second acknowledgment feedback based at least in part on whether decoding the second beam switch command is successful; and transmitting, in the uplink control channel via the first uplink control beam, the second uplink control beam, or both, the second acknowledgment feedback indicating whether decoding the second beam switch command was successful.

9. The method of claim 1, wherein the beam switch command indicates a transport configuration indicator (TCI) state of a plurality of different TCI states.

10. The method of claim 9, further comprising:

receiving control signaling configuring the plurality of different TCI states.

11. The method of claim 1, wherein receiving the beam switch command further comprises:

receiving a medium access control (MAC) control element (CE) comprising the beam switch command.

12. The method of claim 1, wherein receiving the beam switch command further comprises:

receiving downlink control information comprising the beam switch command.

13. The method of claim 1, wherein receiving the beam switch command further comprises:

receiving a grant of resources for the uplink control channel for transmitting the acknowledgment feedback.

14. The method of claim 1, wherein receiving the beam switch command further comprises:

receiving the beam switch command in the downlink shared data channel via a receive beam.

15. The method of claim 14, further comprising:

receiving, in a downlink control channel via a downlink control receive beam, a grant scheduling the beam switch command in the downlink shared data channel.

16. The method of claim 15, wherein the receive beam and the downlink control receive beam are a same beam.

17. The method of claim 15, further comprising:

deriving the first uplink control beam from the downlink control receive beam.

18. A method for wireless communications at a base station, comprising:

transmitting, in a downlink shared data channel, a beam switch command instructing a user equipment (UE) to switch from a first uplink control beam to a second uplink control beam for transmitting acknowledgement feedback by the UE;

monitoring an uplink control channel for the acknowledgment feedback via the first uplink control beam and the second uplink control beam, the acknowledgment feedback indicating whether decoding the beam switch command was successful; and transmitting a transmission to the UE based at least in part on which of the first uplink control beam or the second uplink control beam was used to transmit the acknowledgment feedback.

19. The method of claim 18, further comprising:

determining that the second uplink control beam was used to transmit the acknowledgment feedback, wherein the transmission is a data transmission to the UE.

20. The method of claim 18, further comprising:

determining that the first uplink control beam was used to transmit the acknowledgment feedback, wherein the transmission is a second beam switch command instructing the UE to switch from the first uplink control beam to the second uplink control beam.

21. The method of claim 18, wherein monitoring the uplink control channel for the acknowledgment feedback further comprises:

monitoring the uplink control channel for the acknowledgment feedback during a first transmission time interval (TTI) that occurs prior to a second TTI, the first TTI corresponding to the UE failing to successfully decode the beam switch command.

22. The method of claim 18, wherein monitoring the uplink control channel for the acknowledgment feedback further comprises:

monitoring the uplink control channel for the acknowledgment feedback during a second transmission time interval (TTI) that occurs after a first TTI, the second TTI corresponding to the UE successfully decoding the beam switch command.

23. An apparatus for wireless communications at a user equipment (UE), comprising:

a processor, memory in electronic communication with the processor; and instructions stored in the memory and executable by the processor to cause the apparatus to:

receive, in a downlink shared data channel, a beam switch command instructing the apparatus to switch from a first uplink control beam to a second uplink control beam for transmitting acknowledgement feedback by the apparatus;

select at least one uplink control beam to transmit the acknowledgment feedback based at least in part on whether decoding the beam switch command is successful, wherein each of the first uplink control beam and the second uplink control beam are selected to transmit the acknowledgment feedback based at least in part on successfully decoding the beam switch command; and transmit, in an uplink control channel via the at least one selected uplink control beam, the acknowledgment feedback indicating whether decoding the beam switch command was successful.

24. The apparatus of claim 23, wherein the instructions to select the at least one uplink control beam to transmit the acknowledgment feedback further are executable by the processor to cause the apparatus to:

select the second uplink control beam to transmit the acknowledgment feedback based at least in part on successfully decoding the beam switch command.

25. The apparatus of claim 24, wherein the instructions to transmit, in the uplink control channel via the at least one selected uplink control beam, the acknowledgment feedback, further are executable by the processor to cause the apparatus to:

identify a second transmission time interval (TTI) to transmit the acknowledgment feedback that occurs after a first TTI based at least in part on successfully decoding the beam switch command;

determine not to transmit the acknowledgment feedback via the first uplink control beam during the first TTI; and transmit, in the uplink control channel via the second uplink control beam, the acknowledgment feedback during the second TTI.

26. An apparatus for wireless communications at a base station, comprising:

a processor, memory in electronic communication with the processor; and instructions stored in the memory and executable by the processor to cause the apparatus to:

transmit, in a downlink shared data channel, a beam switch command instructing a user equipment (UE) to switch from a first uplink control beam to a second uplink control beam for transmitting acknowledgement feedback by the UE;

monitor an uplink control channel for the acknowledgment feedback via the first uplink control beam and the second uplink control beam, the acknowledgment feedback indicating whether decoding the beam switch command was successful; and transmit a transmission to the UE based at least in part on which of the first uplink control beam or the second uplink control beam was used to transmit the acknowledgment feedback.

27. The apparatus of claim 26, wherein the instructions are further executable by the processor to cause the apparatus to:

determine that the second uplink control beam was used to transmit the acknowledgment feedback, wherein the transmission is a data transmission to the UE.

28. The apparatus of claim 26, wherein the instructions are further executable by the processor to cause the apparatus to:

determine that the first uplink control beam was used to transmit the acknowledgment feedback, wherein the transmission is a second beam switch command instructing the UE to switch from the first uplink control beam to the second uplink control beam.

\* \* \* \* \*